US011514830B1

(12) United States Patent
Liao et al.

(10) Patent No.: US 11,514,830 B1
(45) Date of Patent: Nov. 29, 2022

(54) ADAPTIVE WAVEFORM NON-LINEARITY COMPENSATION FOR LASER BEAM SCANNING DISPLAYS

(71) Applicant: MICROSOFT TECHNOLOGY LICENSING, LLC, Redmond, WA (US)

(72) Inventors: Wenjun Liao, Mountain View, CA (US); Algird Michael Gudaitis, Fall City, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/359,500

(22) Filed: Jun. 25, 2021

(51) Int. Cl.
*G09G 3/02* (2006.01)
*G02B 26/08* (2006.01)
*G02B 26/10* (2006.01)

(52) U.S. Cl.
CPC .......... *G09G 3/02* (2013.01); *G02B 26/0858* (2013.01); *G02B 26/10* (2013.01); *G09G 2310/067* (2013.01)

(58) Field of Classification Search
None
See application file for complete search history.

(56) References Cited

U.S. PATENT DOCUMENTS

| 8,059,322 B1 | 11/2011 | Brown |
| 2010/0079836 A1 | 4/2010 | Rothaar |
| 2014/0168738 A1 | 6/2014 | Ko |
| 2019/0020860 A1 | 1/2019 | Mcvittie |
| 2019/0310467 A1 | 10/2019 | Resler |
| 2019/0324266 A1 | 10/2019 | Hayashi |
| 2019/0373140 A1 | 12/2019 | Gudaitis et al. |

OTHER PUBLICATIONS

"Notice of Allowance Issued in U.S. Appl. No. 17/361,281", dated Nov. 29, 2021, 9 Pages.
Frigerio, et al., "Closed-Loop Control of Quasi-Static Scanning PZT Micromirrors with Embedded Piezoresistive Sensing and Spurious Mode Rejection", In Proceedings of 21st International Conference on Solid-State Sensors, Actuators and Microsystems (Transducers), Jun. 20, 2021, pp. 435-438.

(Continued)

*Primary Examiner* — Aneeta Yodichkas
(74) *Attorney, Agent, or Firm* — Scott Y. Shigeta; Newport IP, LLC

(57) ABSTRACT

The techniques disclosed herein provide apparatus, methods and systems that adaptively adjust the signal waveform (or waveshape) of the drive signal to a slow-scan mirror to compensate for non-linearities observed in the slow-scan feedback signal from a slow-scan mirror. Over large scan angles and high temperatures, the slow-scan mirror in a laser beam scanning device may exhibit a nonlinear response to the drive signal that results in poor image quality issues such as bright lines, bands in the display image, and image distortion. The presently disclosed technologies track the linearity performance of the overall system by detecting non-linearities in waveform of the slow-scan feedback signal real time, and consequently apply a pre-distortion to the drive waveform to compensate for these detected non-linearities. The parameters, logic and blocks of the control may be implemented in hardware, software or combinations thereof.

20 Claims, 20 Drawing Sheets

(56) References Cited

OTHER PUBLICATIONS

"International Search Report and Written Opinion Issued in PCT Application No. PCT/US22/013442", dated Apr. 14, 2022, 11 Pages.

Frigerio, et al., "A Novel closed-loop Architecture for Accurate Micromirror Trajectory Control in Linear Scanning MEMS-based Projectors", In Proceedings of SPIE, vol. 11697, Mar. 5, 2021, 10 Pages.

"International Search Report and Written Opinion Issued in PCT Application No. PCT/US22/029726", dated Sep. 6, 2022, 14 Pages.

U.S. Appl. No. 17/465,812, dated Sep. 2, 2021.

U.S. Patent No. 11,288,991 dated Mar. 29, 2022.

ADAPTIVE WAVEFORM NON-LINEARITY COMPENSATION FOR LASER BEAM SCANNING DISPLAYS

BACKGROUND

Laser beam scanning ("LBS") display devices form displayed images by using mirrors, such as microelectromechanical systems ("MEMS") mirrors, to direct a laser beam onto a display region. In such display devices, the mirrors may move over the course of a frame to control the location in the display region toward which the laser beam is directed. Some LBS displays use two mirrors, a fast-scan mirror that scans under resonance and a slow-scan mirror that scans linearly. Mirrors used by LBS display devices are susceptible to noise and disturbance forces (e.g., electrical, mechanical, etc.).

In addition to the aforementioned issue, existing systems have a number of other drawbacks. For example, a mirror using certain materials may degrade over time, which can result in poor performance. Additionally, environmental changes (e.g., temperature, humidity, etc.) may also cause changes in characteristics of a mirror. In yet another example, each manufactured mirror may have variations in certain characteristics, such as gain, that are caused by the manufacturing process. These issues, and others, may result in wide performance variations, such as gain variations.

The disclosure made herein is presented with respect to these and other technical challenges.

SUMMARY

The techniques disclosed herein provide apparatus, methods and systems that adaptively adjust the signal waveform (or waveshape) of the drive signal to a slow-scan mirror to compensate for non-linearities observed in the slow-scan feedback signal from a slow-scan mirror. Over large scan angles and high temperatures, the slow-scan mirror in a laser beam scanning device may exhibit a non-linear response to the drive signal that results in poor image quality issues such as bright lines, bands in the display image, and image distortion. The presently disclosed technologies track the linearity performance of the overall system by detecting non-linearities in the waveform from the slow-scan feedback signal in real time, and consequently apply a pre-distortion to the drive waveform to compensate for these detected non-linearities. The parameters, logic and blocks of the control may be implemented in hardware, software or combinations thereof.

Example display devices arranged in accordance with the techniques described herein may include a laser beam emitter, a slow-scan mirror, and a slow-scan controller. The laser beam emitter may be configured to emit a laser beam, where the slow-scan mirror may be responsive to a slow-scan drive signal to direct the laser beam onto a display region and generate a display image. The slow-scan mirror may also generate a slow-scan feedback signal, while the slow-scan driver may be configured to generate the slow-scan drive signal based on a signal waveform. The slow-scan controller may be configured to adjust the slow-scan drive signal for the slow-scan mirror with the slow-scan driver, where the slow-scan controller includes an outer control loop and an inner control loop. The outer control loop may be employed for an open angle control for the slow-scan mirror. The inner control loop may include an adaptive waveform non-linearity compensator for the slow-scan mirror. The outer control loop and the inner control loop are responsive to the slow-scan feedback signal. The adaptive waveform non-linearity compensator of the inner control loop may be configured to actively detect non-linearities in the slow-scan feedback signal and dynamically adjust the signal waveform of the slow-scan drive signal to compensate for the detected non-linearities.

Some example systems arranged in accordance with the techniques described herein may include a laser beam emitter, a slow scan mirror, a slow-scan driver, and a slow scan controller. The laser beam emitter may be configured to emit a laser beam; while the slow-scan mirror may be responsive to a slow-scan drive signal to direct the laser beam onto a display region and generate a display image. The slow-scan mirror may generate a slow-scan feedback signal that indicates VPZR measurements associated with the slow-scan mirror. The slow-scan driver may be configured to generate the slow-scan drive signal based on a signal waveform. The slow-scan controller may be configured to adjust the slow-scan drive signal for the slow-scan mirror with the slow-scan driver, where the slow-scan controller may include an outer control loop and an inner control loop. The outer control loop may be employed for an open angle control for the slow-scan mirror. The inner control loop may include an adaptive waveform non-linearity compensator for the slow-scan feedback signal from the slow-scan mirror. The outer control loop and the inner control loop may be responsive to the slow-scan feedback signal. The adaptive waveform non-linearity compensator of the inner control loop may include a buffer, a linearity error calculator, one or more PID controllers, and a non-linear compensator. The buffer may be configured to receive and buffer the VPZR measurements from the slow-scan feedback signal. The linearity error calculator may be configured to receive the buffered VPZR measurements from the buffer, compute a display ramp from the buffered VPZR measurements, detect linearity deviation (LD) in one or more regions of the display ramp, and generate one or more a non-linearity error signals based on the detected LD in the one or more regions of the display ramp. Each of the one or more PID controllers may be configured to generate a control signal responsive to a corresponding one of the non-linearity error signals. The non-linear compensator may be configured to receive each control signal from the one or more PID controllers and actively adjust a characteristic of the signal waveform of the slow-scan drive signal to pre-distort the signal waveform to compensate for detected non-linearities in the slow-scan feedback signal on the one or more regions of the display ramp with detected linearity deviation.

Some example methods to display an image in a display region of a display device may include generating a signal waveform for a slow-scan drive signal that drives a slow-scan mirror; directing a laser beam onto the display region of the display device to display the image, where a beam deflection angle of the laser beam is responsive to the slow-scan drive signal; generating a slow-scan feedback signal that includes VPZR measurements associated with the slow-scan mirror; receiving the slow-scan feedback signal with VPZR measurements from the slow-scan mirror; evaluating the VPZR measurements to identify a non-linearity characteristic of the slow-scan feedback signal; calculating one or more compensation parameters associated with the signal waveform based on the VPZR measurements when the non-linearity characteristic of the slow-scan feedback signal is identified; and adjusting the signal waveform of the slow-scan drive signal such that the slow-scan drive signal is pre-distorted to compensate for the identified non-linearity characteristic of the slow-scan feedback signal based on the one or more compensation parameters.

The described embodiments may be implemented as hardware, software, or a combination of hardware and software. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
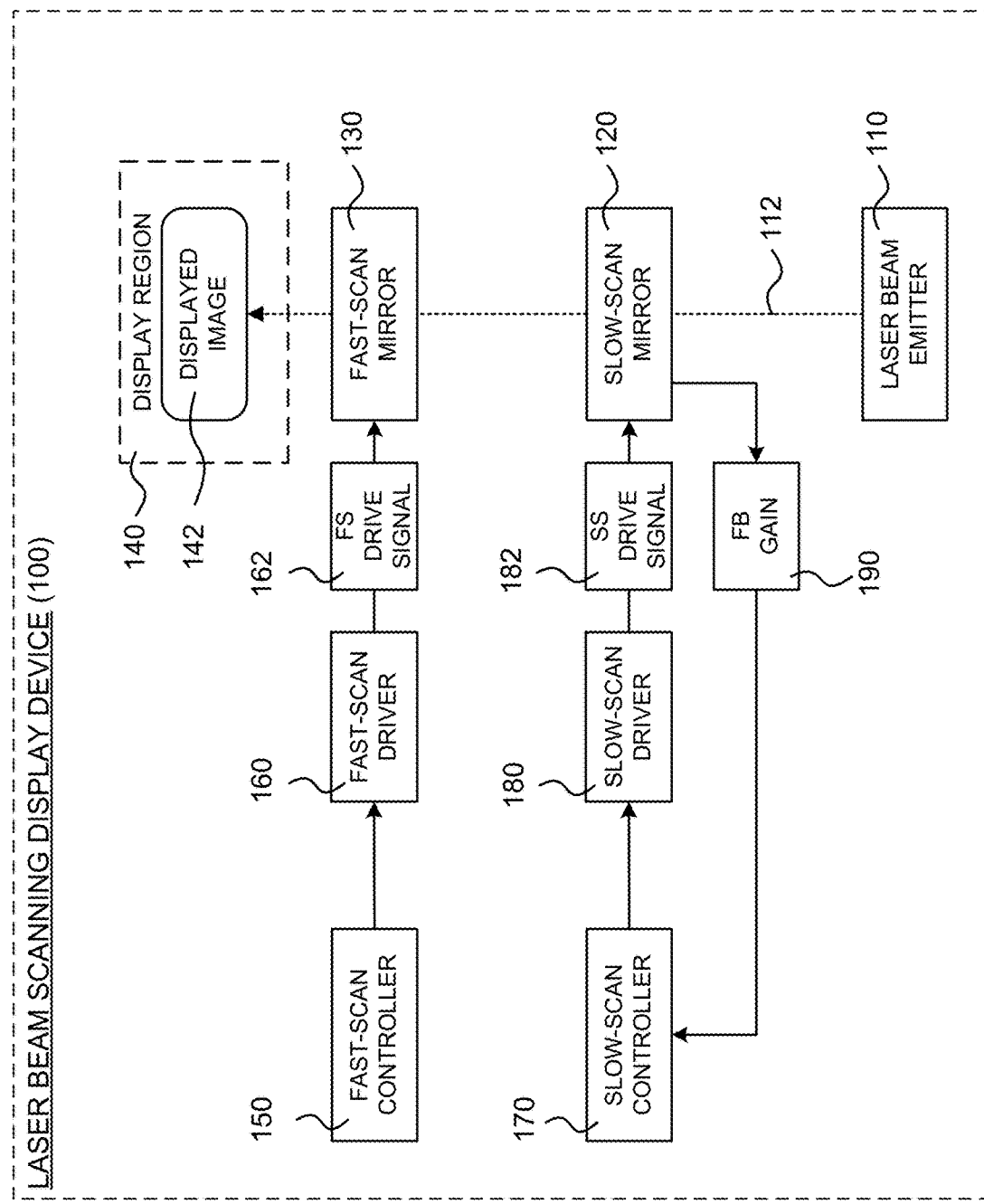
FIG. 1A shows an illustrative laser beam scanning display system.

The following detailed description is directed to technologies for improving display image quality in a laser beam scanning ("LBS") display device. A laser beam scanning ("LBS") display device typically includes a laser beam emitter, a slow-scan (SS) controller and driver, a fast-scan (FS) controller and driver, a slow-scan (SS) mirror, and a fast-scan (FS) mirror. The laser beam emitter is configured to emit a laser beam to the FS and SS mirrors, which may be implemented as microelectromechanical systems ("MEMS"). The FS mirror, under control of the FS controller, scans across one axis of the display under resonance (e.g., vertical scanning of the display). The SS mirror, under control of the SS controller, scans linearly across another axis of the display ((e.g., horizontal scanning of the display).

The slow-scan controller in the LBS display device includes an inner control loop that is used for trajectory control, disturbance rejection, and noise suppression. The linearity and gain of the SS trajectory is an important aspect of display image quality in an LBS display device. To control the SS mirror assembly, the SS controller may utilize two control loops, an outer control loop for open angle control (OAC), and an inner control loop for gain and stability control. The overall gain of this inner loop should be kept as close to constant as possible to maintain optimum performance (e.g. reduced jitter, even scan lines, etc.). When the loop gain is either higher or lower than the desired value, the SS control loop may be more vulnerable to external disturbances, which may result in more jitter or uneven scan line density in the resulting display images.

Since the SS mirror is often implemented as a MEMS device, the SS mirror is often driven with a voltage that uses a PZT material (Lead Zirconate Titanate). However, the PZT material degrades quickly over time (e.g., about one hundred to three hundred hours of use), which results in poor performance. Additionally, environmental changes (e.g., temperature, humidity, etc.) may also cause changes in the overall gain of the SS mirror. In yet another example, each manufactured mirror may have variations in gain that are due to the manufacturing process, which may result in wide gain variations.

In addition to the gain loss in the SS mirror as described above, the SS mirror is a mechanical device that exhibits non-linearity effects by nature. The mirror deflection at constant voltage deteriorates quickly over time (e.g., within about one hundred to three hundred hours of use). The peak-to-peak defection angle of the SS mirror will determine the field of view (e.g., the vertical FOV). To keep a constant vertical field of view (VFOV), the control system will attempt to apply higher and higher drive voltages to the SS mirror, which could hasten the SS mirror degradation. Although the VFOV will be kept constant by the control system, the required increase in drive voltage to compensate the SS mirror scan angle degradation affects the non-linearity. Also, the larger the open angle, the faster the mirror scan angle degrades. The non-linearity compensation loop of the presently disclosed technology compensates for these types of changes in gain, non-linearity, and others, by altering the drive signal to the slow-scan mirror.

Through implementations of the disclosed technologies, an LBS architecture may be implemented to adaptively compensate for non-linearities via active detection of non-linearities in the SS feedback signal from the SS mirror, and by actively applying compensation parameters to the slow-scan drive waveform such that the waveform is intentionally distorted to match and compensate for the detected non-linearities in real time. The proposed adaptive waveform non-linearity compensation scheme is resilient over a very wide range of non-linearities and improves the overall display image quality. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for protecting mirrors in an LBS display device will be described.

FIG. 1A shows an illustrative laser beam scanning (LBS) display device 100. As illustrated, the LBS display device 100 includes a laser beam emitter 110 that generates an incident beam 112 that is deflected by a FS mirror 130 and a SS mirror 120. Beam deflection along a first axis (e.g., vertical axis) is provided by the FS mirror 130 in response to a FS drive signal 162, which is provided by a FS controller 150 via a FS driver 160. Beam deflection along a second axis (e.g., horizontal axis) is provided by the SS mirror 120 in response to a SS drive signal 182, which is provided by a SS controller 170 via a SS driver 180. The FS mirror 130 and the SS mirror 120 may be MEMS mirror devices. In such LBS display devices, a mirror drive waveform is generated by each of the respective controllers to direct the laser beam 112 over the course of a frame to display an image 142 in a display region 140.

The SS mirror 120 and the FS mirror 130 may be configured to direct (e.g., reflect, deflect, steer, etc.) the emitted laser beam 112 onto the display region 140. The displayed image 142 may be displayed in one or more frames in which the slow-scan mirror 120 and the fast-scan mirror 130 direct the laser beam 112 across the display region 140 to "draw" the displayed image 142.

In some embodiments, the SS mirror 120 is configured to complete a slow-scan period during each frame. The slow-scan period may include a display interval. The slow-scan mirror 120 may linearly scan across the display region 140 from an initial scanning position to a final scanning position. The laser beam emitter 110 may be configured to emit the laser beam 112 during the display interval. In the display interval, the fast-scan mirror 130 may perform multiple scans across the display region 140 to "draw" the displayed image 142.

The slow-scan period may further include a non-display interval. During the non-display interval, the slow-scan mirror 120 may be configured to return from the final scanning position to the initial scanning position. This portion of the non-display interval may also be referred to as "the flyback."

During the non-display interval, the laser beam emitter 110 may be configured to not emit the laser beam 112. In some embodiments, the display region 140 may include one or more blank regions in which the displayed image 142 is not displayed. In addition to the flyback, the non-display interval may include time during which the slow-scan mirror 120 is oriented toward the one or more blank regions. The initial scanning position and the final scanning position may be located in the one or more blank regions.

As also described briefly above, the SS mirror 120 used by LBS display device 100 may be susceptible to electrical and mechanical disturbances, and other environmental conditions, which can cause change in the overall loop gain of the SS mirror 120. A feedback gain block 190 may be employed by the LBS display device 100 to provide feedback from the SS mirror 120 to the SS controller 170, where the SS controller 170 may compensate for changes in the loop gain of the SS mirror.

An example MEMS based SS mirror 120 may include a Lead Zirconate Titanate (PZT) material, a MEMS mirror (the mechanical mirror device), and a piezo-resistive (PZR) material. The PZT material is a piezo-electric driver (or actuator) that is configured to drive the MEMS mechanical mirror in the SS mirror 120 in response to a signal (e.g., a voltage, current) from the drive circuit of the SS mirror 120. The PZR material is configured as a piezo-resistive sensor that generates a feedback signal from the SS mirror 120 based on the position or angle of the MEMS mirror via the operation of the PZR material with the sense circuit in the SS mirror 120.

Figure 1B:
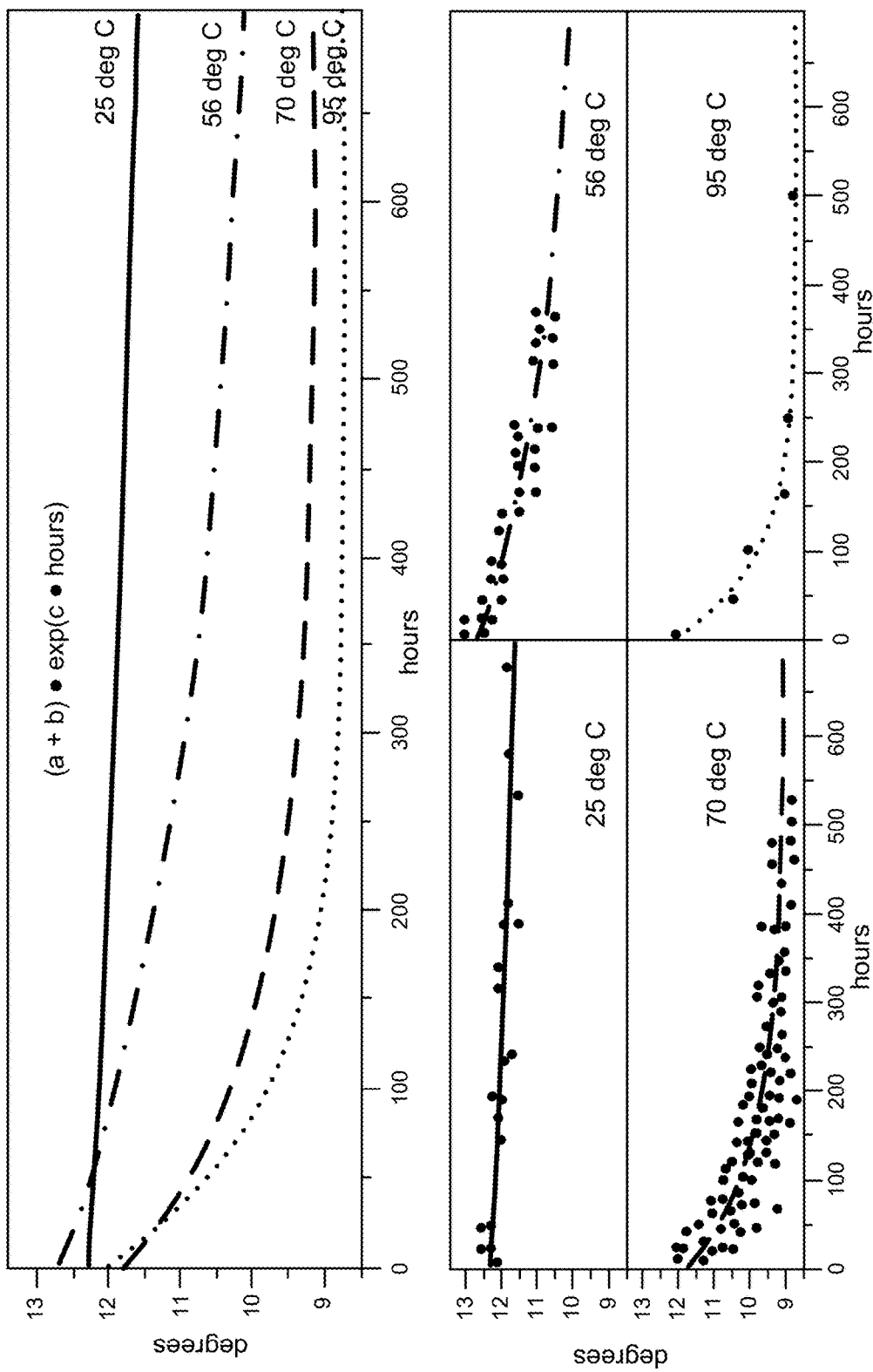
FIG. 1B shows graphs that illustrate changes in the performance of the slow-scan mirror over temperature and time.

FIG. 1B shows graphs that illustrate changes in the performance of the slow-scan mirror over time and temperature. As shown, the open loop scan angle for a constant voltage changes based on both operating time and temperature. The PZT "gain" degrades over time, which reduces the vertical field of view (VFOV) for a fixed range of drive voltages. To keep a constant VFOV, the open angle control (OAC) block thus needs to apply higher and higher drive voltages to the SS mirror, which may hasten further degradation in the PZT material of the SS mirror assembly. Although the VFOV may be kept substantially constant by the operation of the SS controller, the required increase in drive voltage to compensate the SS mirror scan angle degradation affects the non-linearity. Also, the larger the open angle, the faster the mirror scan angle degrades. This brings more challenges to the overall display, since the VFOV target may be large (e.g., nominally 40 degrees, or in a range of about 35 to 45 degrees). Thus, the larger the open angle, the faster the PZT material will degrade, with lower and lower gains in the PZT material. For wide viewing angle targets, e.g. 35 to 45 degrees angles, the challenges of lost gain are too great for simple gain compensation.

For SS mirror devices operating over wider and wider temperature ranges, there are significant variations in the gain of both the PZT and PZR materials. As shown in FIG. 1B, the loss of angle for constant voltage is significantly faster for increased temperatures. For example, at 200 hours of use, the loss in angle is less than 1 degree at 25 deg C., about 1.5 degrees at 56 deg C., about 2.5 degrees at 70 deg C., and about 4 degrees at 95 degrees C. Thus, for higher and higher operating temperatures loss of viewing angle occurs faster and with a much more significant total loss. This wider operating temperature ranges produces variations in both the PZT and PZR gains, making the loop performance variable and less predictable.

Large angles and high temperatures require more and more drive voltage, so the non-linearity effects become more obvious which means a linear voltage drive produces a less and less linear scan angle in the display region. The non-linearity severely impacts the display image quality, for example, bright lines and bands in the images, distortion, etc. The higher the non-linearity level, the worse the visual impact.

A possibility compensation approach is to measure the non-linearity of the MEMS mirror at the factory, and to calibrate each mirror assembly. Calibration can be done once in the factory for an entire class of mirrors, and the same fixed parameters would be used for the entire product lifetime. dd The non-linearity of the SS mirror is worse when driven to a larger angle (e.g., about 40 degree). Also, since the non-linearity of the SS mirror will change with temperature, humidity, and time, as the drive-voltage-to-angle behavior changes, compensation becomes very difficult. Since the non-linearity may be different from mirror to mirror (e.g., from manufacturing differences), a single class-based compensation may not yield satisfactory results for all devices. These challenges require an innovation for non-linearity compensation.

A potential solution to the SS mirror degradations may be to improve the SS mirror design, by selection of a new MEMS design or by finding other new materials that have less sensitivity to such variations in manufacturing, temperature, etc. However, design of a new MEMS device with new materials requires significant processing and design work, and a solution may be difficult or practically impossible to find.

The present techniques described herein describe methods and control approaches to add linearity-tracking capability in the control system, so that the SS mirror non-linearity is always compensated to ensure the SS mirror's optimal performance. In addition to tracking non-linearities that result from the SS mirror, the present techniques will also compensate for non-ideal performance of other components of the system that yield a non-linearity that can be detected in the SS feedback signal from the SS mirror. Thus, the adjustment of the SS drive signal disclosed herein is equally applicable to other sources of non-linearities and is not limited to non-linearities that may result from the SS mirror.

Figure 2:
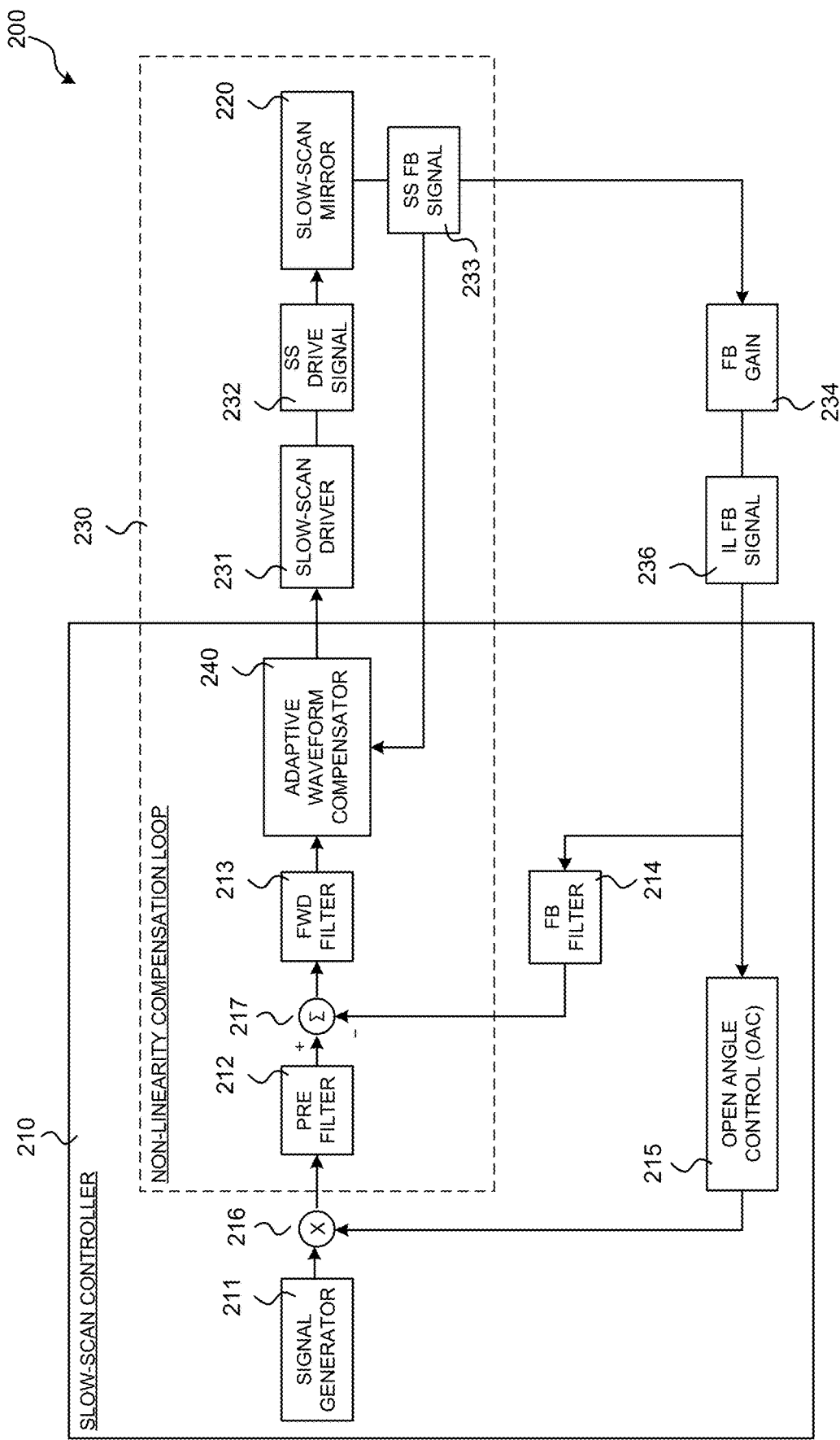
FIG. 2 shows a slow-scan controller topology for a laser beam scanning display device with an adaptive waveform non-linearity compensator.

FIG. 2 shows a slow-scan (SS) controller topology for a laser beam scanning (LBS) display device 200 with an adaptive waveform non-linearity compensator that is arranged in accordance with aspects of the present disclosure. As shows, the LBS display device 200 includes a slow-scan (SS) controller 210, a slow-scan (SS) mirror 220, a slow scan driver 231, a feedback (FB) gain block 234, and an adaptive waveform compensator block 240.

The SS controller 210 may include a signal generator 211, a multiplier 216, a pre-filter 212, a summer 217, a forward filter 213, an adaptive waveform compensator 240, a feedback filter 214, and an open angle control (OAC) block 215. As will be described later, the SS mirror 220 may include a drive circuit, a MEMS assembly, and a sense circuit; where the MEMS assembly may include a PZT material, a MEMS mechanical mirror, and a PZR material.

The SS mirror 220 is configured to adjust the viewing angle in response to a SS drive signal 232 received from the SS driver 231, and to provide a feedback signal 233 to the FB gain block 234, where the feedback signal 233 corresponds to a measured response to the SS drive signal 232.

The SS controller 210 is configured to generate the SS dive signal 232. via the SS driver 231. for the SS mirror 220. The waveform that forms the overall shape of the SS drive signal 232, is generated by signal generator 211 via the operation of the pre-filter 212 and the forward (FWD) filter 213, along with the various components of the outer and inner control loops. The outer control loop is configured to combine, via the multiplier block 216, the output of the signal generator 211 with the output of open angle control (OAC) block 215, which is responsive to the SS FB signal 233 from the SS mirror 220 via the feedback (FB) gain block 234. The output of the multiplier block 177 is coupled to the input of the pre-filter 172. The output of the pre-filter 212 is coupled to an input (shown as the + input) of the summer block 217. The output of the feedback filter 214 is coupled to another input (shown as the − input) of the summer block 217. The output of the summer block 217 is coupled to an input of FWD filter 213. The inner control loop is configured to compare, via summer 217, the combined output of the combined pre-filter 212 and open angle control (OAC) block 215 with the inner loop feedback (e.g., IL FB Signal 235) signal via the feedback (FB) filter 214, which is also responsive to the SS FB signal 233 from the SS mirror 220 via the feedback (FB) gain block 234. Thus, the outer control loop and the inner control loop are both responsive to the SS FB signal 233.

The inner control loop also includes the adaptive waveform compensator 240 for the slow-scan mirror 220. The adaptive waveform compensator 240 of the inner control loop 230 is configured to actively detect non-linearities in the waveform of the slow-scan feedback signal 233, and also configured to dynamically adjust the signal waveform of the slow-scan drive signal 232 to compensate for the detected non-linearity. The adaptive waveform compensator block 240 performs waveform analysis to assist in waveform shaping of the slow-scan drive signal 232 as will be described further below.

The waveform of the SS drive signal 232 will typically be a triangle shaped waveform such as a linear ramp or a sawtooth that drives the display (sometimes called a display ramp). However, the SS mirror 220 and other system components may exhibit non-ideal characteristics that result in a non-linearity that is detected in the slow-scan feedback signal, which may result in poor image quality. These non-linearities may occur for a host of reasons such as device to device variations due to manufacturing, depletion of materials in the devices that may occur over time while in use, as well as from environmental changes including temperature and humidity.

Figure 12A:
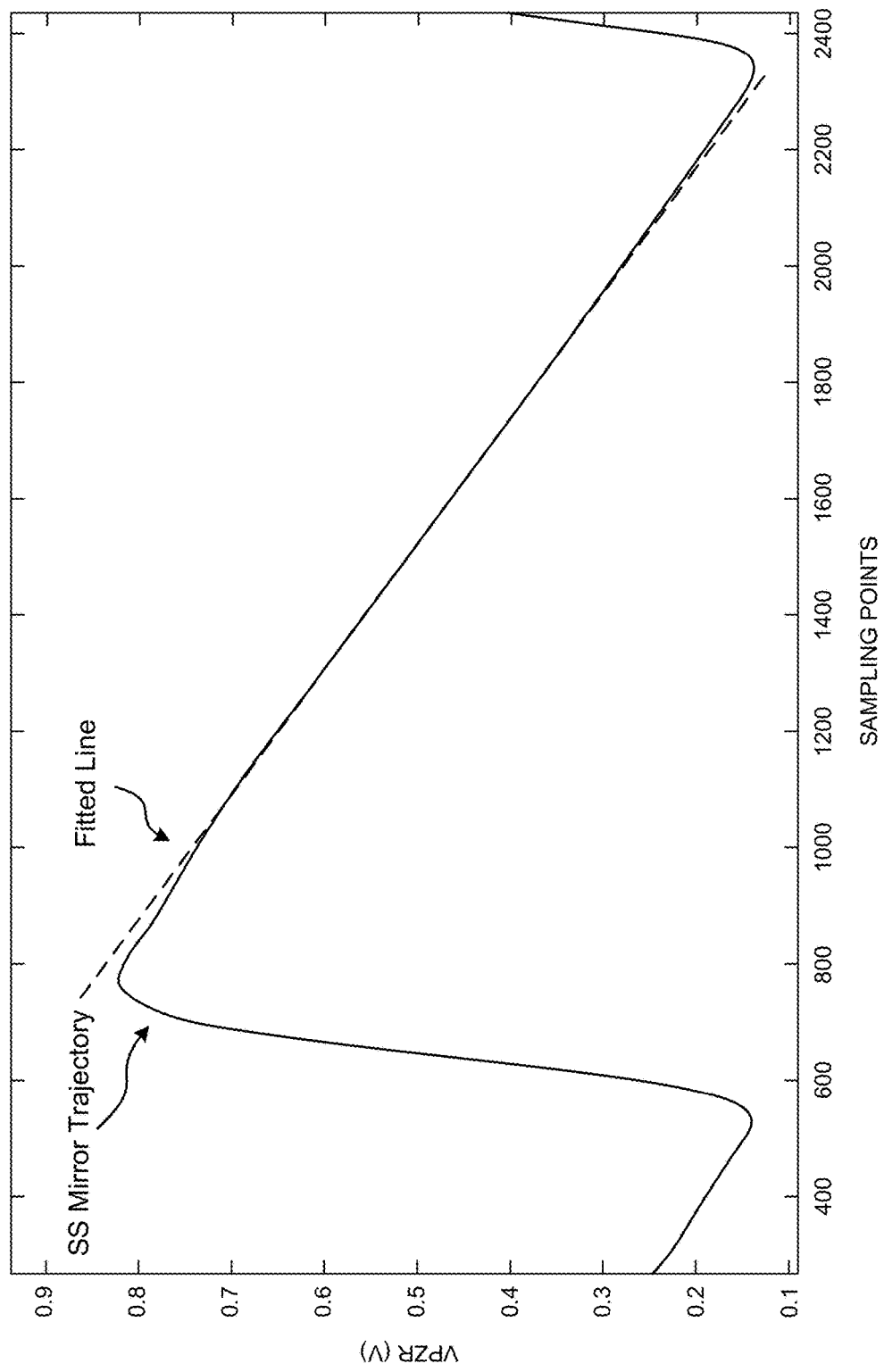
FIG. 12A shows a graph illustrating gain differences with a non-linearity error that is captured from VPZR measurements in an example system.

FIG. 12A shows a graph illustrating gain differences with a non-linearity error that is captured from a slow-scan feedback signal that includes VPZR measurements in an example system. The VPZR measurements correspond to data points from the feedback signal of a MEMS based SS mirror for an entire display frame that is captured and displayed.

As shown in FIG. 12A, the measured SS trajectory (changing angle versus time) resulting from the mirror drive non-linearity is deformed, and thus not shaped as a perfect linear ramp. Considering an example display frame as a set of 2400 sample points, a complete cycle of the linear ramp is observed over these sample points highest to lowest measurement values for the VPZR measurements. In this example display frame, the highest point of the ramp is observed around sample point 700, and the lowest point or valley in the ramp is shown around sample point 2300. A best fit straight dashed line is superimposed between the peak and valley over the measured trajectory to indicate the desired linear ramp shape. In certain regions of the measured trajectory the waveform deviates from the desired linear ramp. For example, between about sample point 700 to about sample point 1100, a first non-linearity deviation is observed; and between about sample point 2100 and about sample point 2300, a second non-linearity deviation is observed.

The presently disclosed technologies describe methods to add linearity-tracking capability in the control system, so that the SS mirror non-linearity is always compensated to ensure the SS mirror's optimal performance. To quantify the non-linearity, real time VPZR measurements from the SS mirror is captured from the SS FB signal. Then, the captured real time measurements are compared to an ideal linear ramp to determine the amount of linearity deviation (LD) as follows:

$$LD = \frac{y_{fit} - y_{vpzr}}{rampmax - rampmin} \times verticalpixels \quad \text{(Eq. 1)}$$

Where:

$y_{fit}$ corresponds to all of the y values of the fitted dashed straight line, $y_{vpzr}$ corresponds to all of they values of the VPZR measurements for a display region, rampmax is the maximum value of the VPZR ramp, rampmin is the minimum value of the VPZR ramp, and verticalpixels is the number of pixels in the VFOV.

Figure 12B:
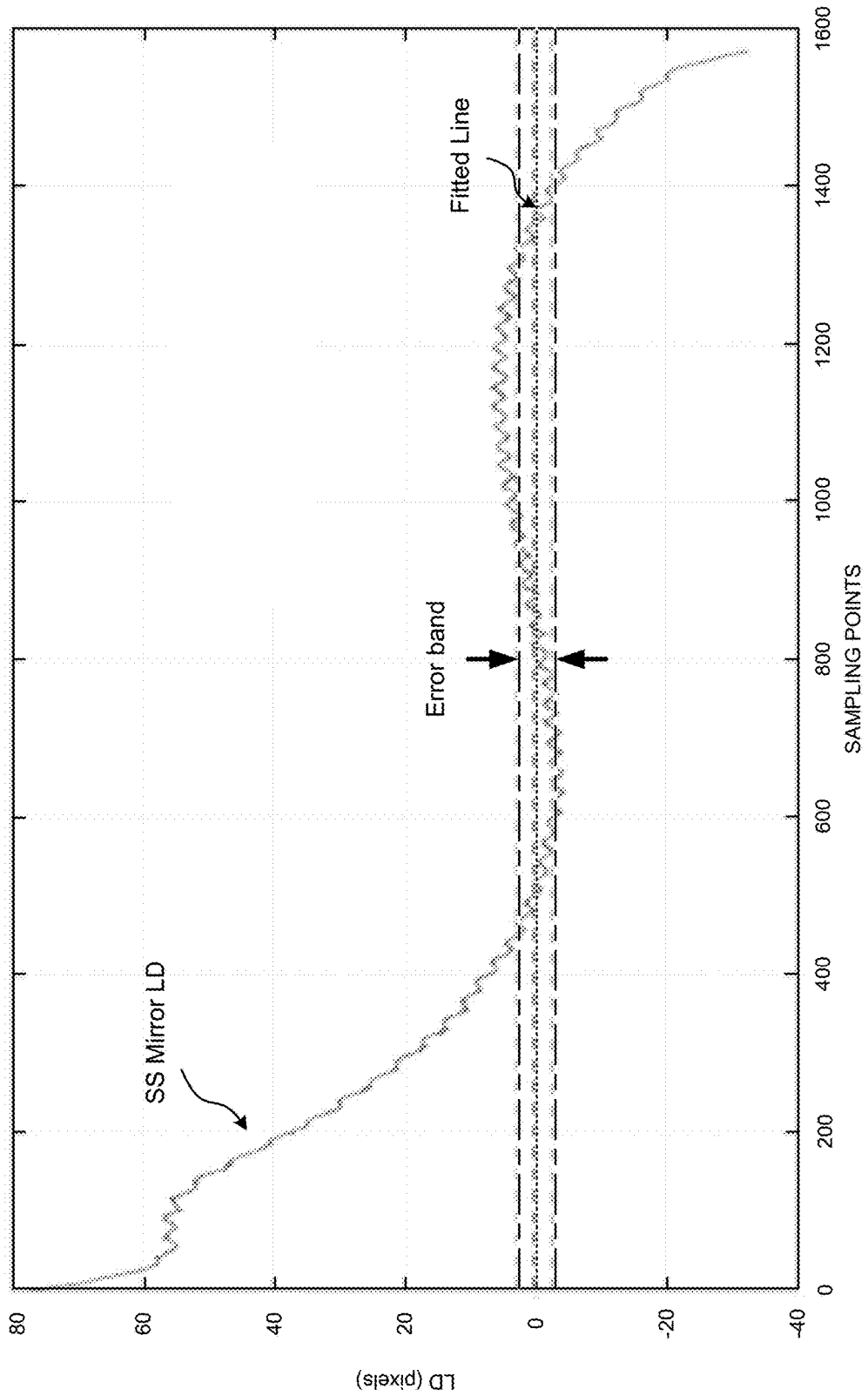
FIG. 12B shows a graph illustrating linearity deviation (LD) for captured VPZR measurements, such as the VPZR measurements shown in FIG. 12A.

The VPZR measurements collected for Eq 1. can be utilized to identify one or more regions of non-linearity. FIG. 12B shows a graph illustrating linearity deviation (LD) for at least a portion of the captured VPZR measurements, such as the VPZR measurements shown in FIG. 12A. For the example of FIG. 12B, a portion of the sample points are ignored (e.g., the flyback portion, etc.). Additionally, in various examples, only a portion of the VPZR measurements may be utilized for the best fit calculations (e.g., 70% of the sample points about a midpoint of the ramp portion of the signal, which is the substantially linear portion in this example). By selecting the portion that is most linear (e.g., the middle portion), the slow-scan feedback signal will substantially follow the slow-scan drive signal.

From FIG. 12B, the LD is observed to vary over the sampled points. In particular, the sampled points are different between the front portion sampled points (e.g., from sampled point 1 to about sampled point 800) and the end portion of the sampled points (e.g., from about sampled point 800 to about sampled point 1600). One possible interpretation is that the sampled points can be clustered into regions, where each region may require a different non-linearity compensation parameter (e.g. alpha and beta compensation parameters to compensate the ramp non-linearity). Although two regions are identified in this example, any number of regions can be designated to give additional degrees of control over the compensation. Therefore, the described methods are not limited to two non-linearity compensation parameters and could be applied to as many parameters as may be needed.

Linearity compensation can be continually applied through the compensation loop to attempt to reach zero error. However, in some examples, the degree of linearity compensation applied can be guard railed with minimum and maximum values. For example, if more than 90% of the VPZR LD curve values are within +/−2 pixels (between the two dashed lines in FIG. 12B), the linearity of the ramp may be considered acceptable, where the non-linearity may be considered well compensated. For this example, the adaptive waveform non-linearity compensation may be continuously adjusted by the SS controller until 90% of the VPZR LD curve is maintained within +/−2 pixels of ideal linearity. However, other adjustment ranges and pixel values are also contemplated (e.g., +/−1 pixel, +/−2 pixels, +/−3 pixels, +/−4 pixels, etc.).

The presently disclosed methods propose an adaptive waveform non-linearity compensation control structure where the non-linearity of the SS feedback signal from the slow-scan mirror is actively detected by the system. Compensation parameters are generated automatically by the system to match the varying SS mirror non-linearity in real time. The proposed adaptive waveform non-linearity compensation (ANC) can track and reduce SS non-linearity over a very wide range and therefore improves the display quality, without requiring a redesign of the SS mirror and related assembly.

FIGS. 3-6 show block diagrams of example beam scanning (LBS) display devices with various adaptive waveform non-linearity compensators arranged in accordance with the presently disclosed techniques.

For each of the examples illustrated below, non-linearity in the gain characteristics are detected in the SS FB signal 233, and a waveform shaping adjustment is made by the adaptive waveform compensator 240 to effect a change in the waveform shape of the SS drive signal 232 in real time. As previously stated, the SS drive signal 232 is ideally a linear ramp type of signal, and a gain characteristic of the MEMS mirror assembly may be evaluated by measurements of the SS FB signal.

Figure 3:
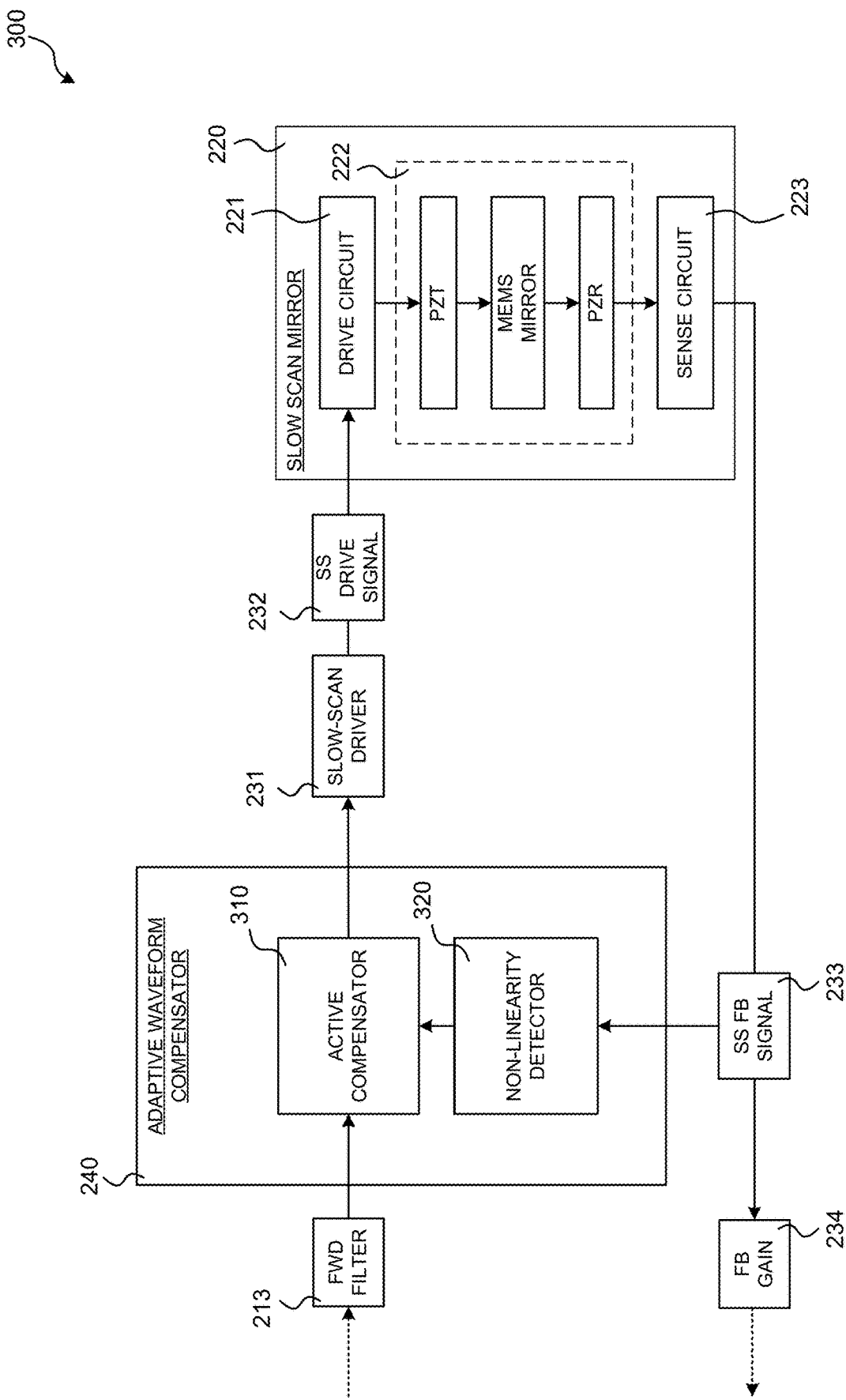
FIG. 3 shows a block diagram of an example beam scanning (LBS) display devices with an adaptive waveform non-linearity compensator.

FIG. 3 illustrates an example adaptive waveform non-linearity compensation topology 300 that may be employed the laser beam scanning (LBS) display device 200 of FIG. 2. As illustrated, the example adaptive waveform compensator block 240 of FIG. 3 includes an active compensator 310, and a non-linearity detector 320.

The non-linearity detector 320 is configured to evaluate the VPZR measurements (which may be digital or analog values) from the SS mirror 220 via the SS FB signal 233. As illustrated, the SS mirror 220 includes a drive circuit 221, a MEMS assembly 222, and a sense circuit 223. The MEMS assembly 222 may include a PZT material, a MEMS mechanical mirror, and a PZR material. The sense circuit 223 may be configured to generate measurements signals from the PZR material, which is then provided as at least a portion of the SS FB signal 233.

In various implementations, the sense circuit of the SS Mirror 220 may include an analog-to-digital converter (ADC) to convert an analog signal (e.g., current or voltage) from the PZR material (e.g., VPZR for voltage, or IPZR for current) into a digital value that indicates the measured angle of the SS mirror 220. In some other examples, the sense circuit of the SS mirror 220 may include one or more of an amplifier circuit, a limiter circuit, a filter circuit, or combinations thereof. For sake of simplicity, the term VPZR measurement as used herein may refer to either an analog value or a digital value that corresponds to a measurement from the PZR material, which may be either a voltage-based measurement or a current-based measurement. The choice of the VPZR measurement signal will depend on the implementation of the slow-scan mirror 220 and its related circuits, as well as the controller design being digitally or analog based.

The active compensator 310 is configured to receive the waveform signal for the linear ramp from the signal generator 211 via FWD filter 213 and feedback from the open angle control 215 and generate an adjusted waveform signal for the slow-scan driver 231. The shape of the adjusted waveform signal will substantially correspond to the shape of the SS drive signal 232 for the SS mirror 220, which once adjusted may be unlike a linear ramp since the non-linearity compensation is provided as part of the SS drive signal 232. Based on the output of the non-linearity detector 320, the active compensator will adjust the overall waveform shape for the SS drive signal 232 (via SS driver 231) in real time.

Figure 12C:
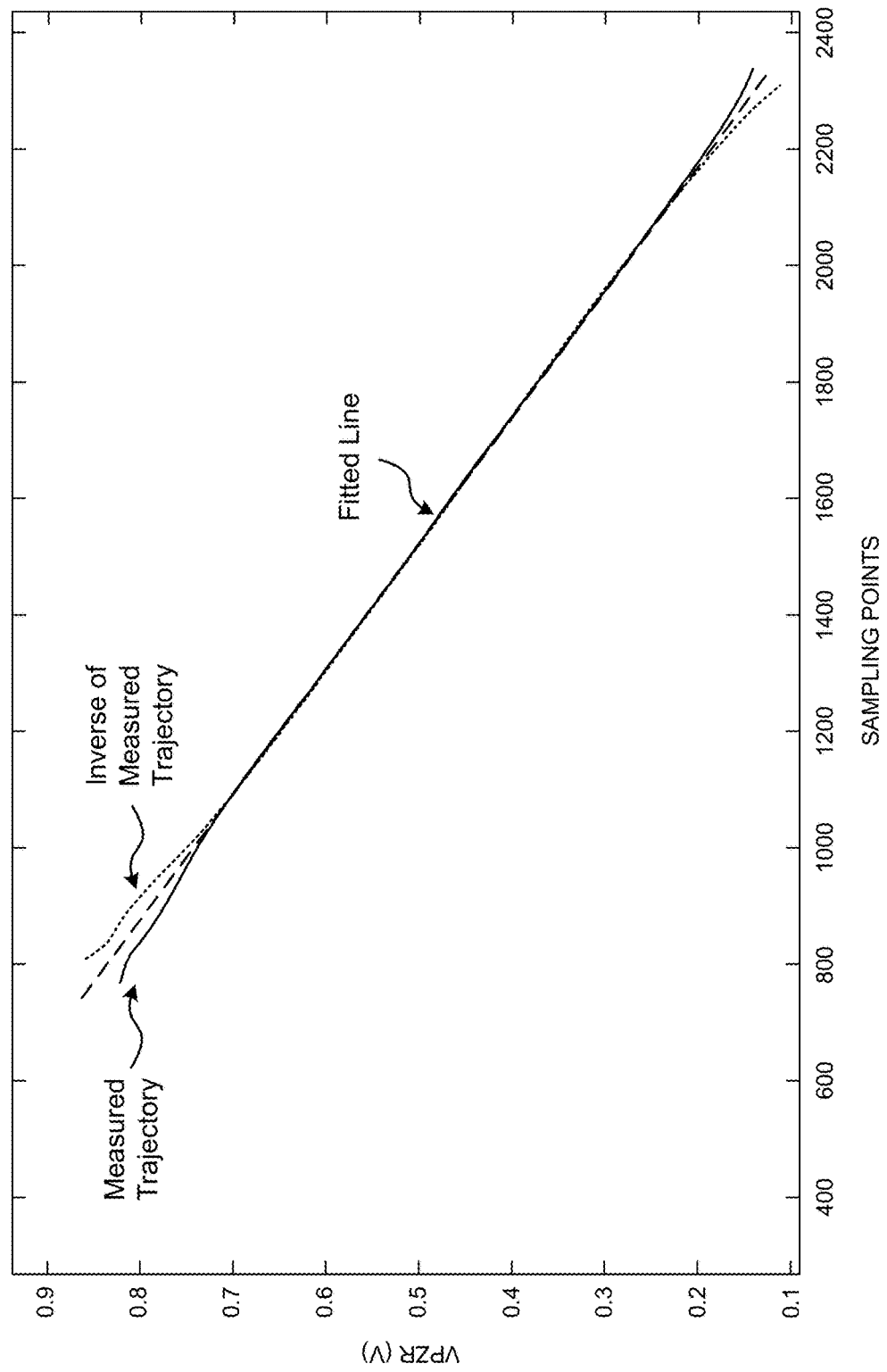
FIG. 12C shows a graph illustrating a slow-scan feedback signal with a non-linearity error, and an inverse function for the slow-scan feedback signal.
Figure 13A:
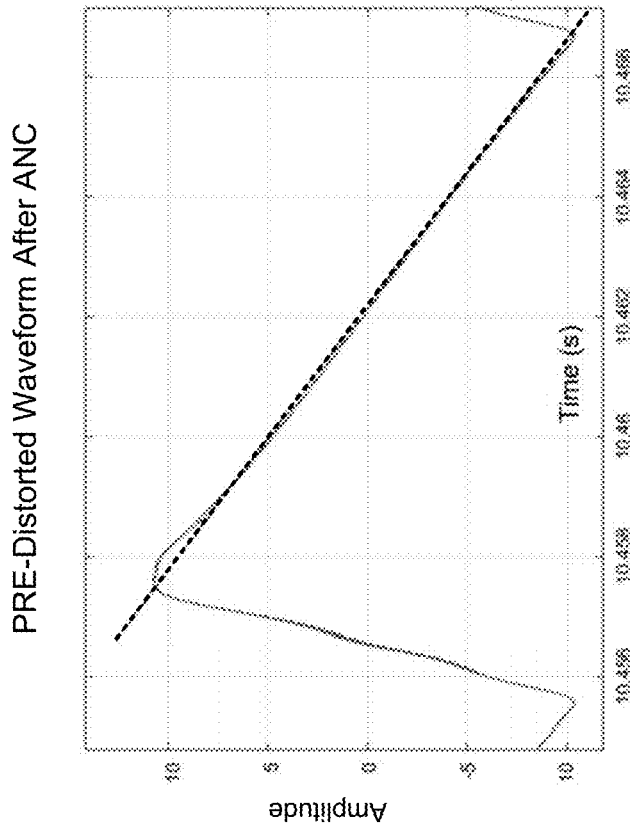
FIGS. 13A-13B shows a set of graphs illustrating example drive waveforms for the SS mirror, and the corresponding linearity deviation measurements, before and after adaptive waveform non-linearity compensation (ANC).
Figure 13A:
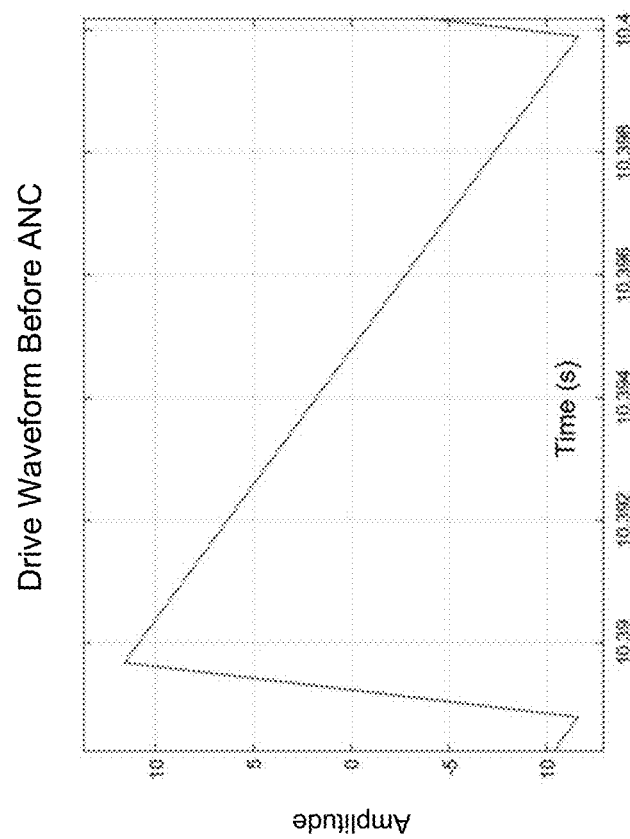
Figure 13B:
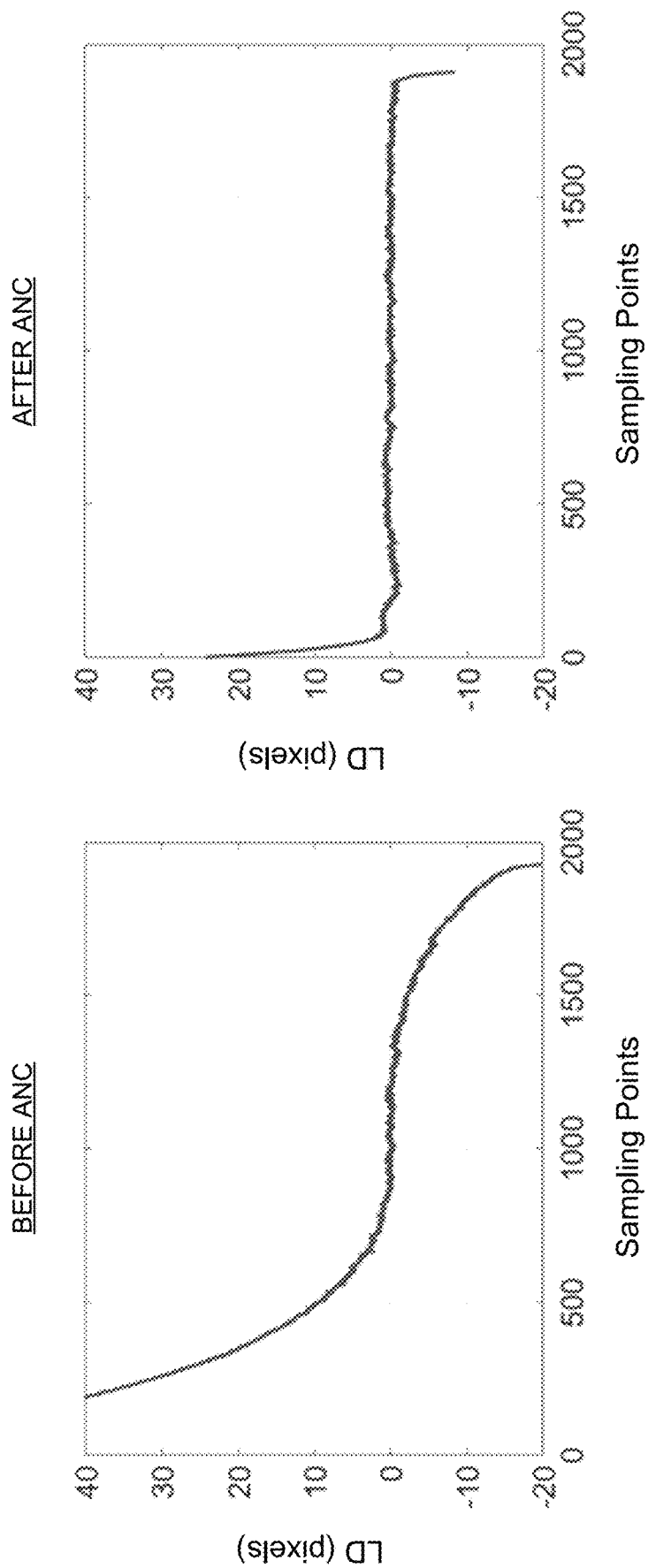

FIG. 12C shows a graph illustrating a SS feedback signal with a non-linearity error, and an inverse function for the same slow-scan feedback signal. The SS feedback signal includes a portion of the VPZR measurements from FIG. 12A, where the flyback portions on the front and back end of the signals are eliminated. A best fit line is illustrated on the same graph by the dashed line, which again is determined by the substantially linear portion (e.g., the middle portion) of the SS feedback signal, and which closely matches the SS drive signal. Also illustrated is an inverse of the measured SS trajectory, which can be leveraged to adapt the waveform of the SS drive signal to counteract and compensate for the detected non-linearities found in the SS feedback signal. The inverse waveform of the measured trajectory applied may be calculated using any appropriate numerical methods, including but not limited to a Taylor series expansion, a polynomial fit, etc.

In some implementations, the drive circuit of the SS mirror 220 may include a digital-to-analog converter (DAC) to convert the SS drive signal 232 from a digital value (e.g. binary data) into an analog signal (e.g., a current or voltage) that drives the PZT material to actuate the MEMS mechanical mirror to adjust the viewing angle. In some examples, the drive circuit of the SS mirror 220 may include one or more of an amplifier circuit, a limiter circuit, a filter circuit, or combinations thereof. For sake of simplicity, the term SS drive signal 232 as used herein may refer to either an analog value or a digital value, and which may also correspond to either a voltage-based signal or a current-based signal. The choice of the SS drive signal will depend on the implementation of the slow-scan mirror 220 and its related circuits, as well as the choice of the controller design being digitally or analog based.

In some examples, the waveform adjustments may be executed in a continuous time fashion, while in other examples the waveform adjustment may be executed at a periodic rate (e.g., 10 Hz, 15 Hz, 20 Hz, 30 Hz, 60 Hz, 90 Hz, 100 Hz, 120 Hz, etc.). By adjusting the waveform shape of the SS drive signal 232, a target linearity can be achieved in the performance of the SS mirror 220.

In various examples, the SS driver 231 may generate an analog signal for the SS drive signal 232, where the drive circuit 221 may be adapted to receive the SS drive signal 232 as an analog value and responsively drive the PZT material with either an analog voltage or analog current. In other examples, the SS driver 231 may generate a digital signal for the SS drive signal 232, where the drive circuit 221 may be adapted to convert the digitally based SS drive signal 232 to an analog value to responsively drive the PZT material with either an analog voltage or analog current. In some examples, the drive circuit 221 may be eliminated in the SS mirror 220, where the slow-scan driver 231 may be adapted to directly drive the PZT material of the SS mirror 220.

In some examples, the sense circuit 223 may generate an analog signal for the SS FB signal 233 that includes VPZR measurements encoded therein, where the adaptive waveform non-linearity compensator 221 may be configured to receive and process the VPZR measurements from the SS FB signal 233 in the analog domain. In additional examples, the sense circuit 223 may generate a digital signal for the SS FB signal 233 (e.g., via an ADC in the sense circuit 223), where the adaptive waveform non-linearity compensator 221 may receive and process the VPZR measurements from the SS FB signal 233 in the digital domain. In still more examples, the sense circuit 223 may generate an analog signal for the SS FB signal 233, which includes VPZR measurements encoded in the SS FB signal 233, where the adaptive waveform non-linearity compensator 221 may convert the analog based SS FB signal 233 into a digital signal (e.g., via an ADC in the SS controller), and process the VPZR measurements in the digital domain.

Figure 4:
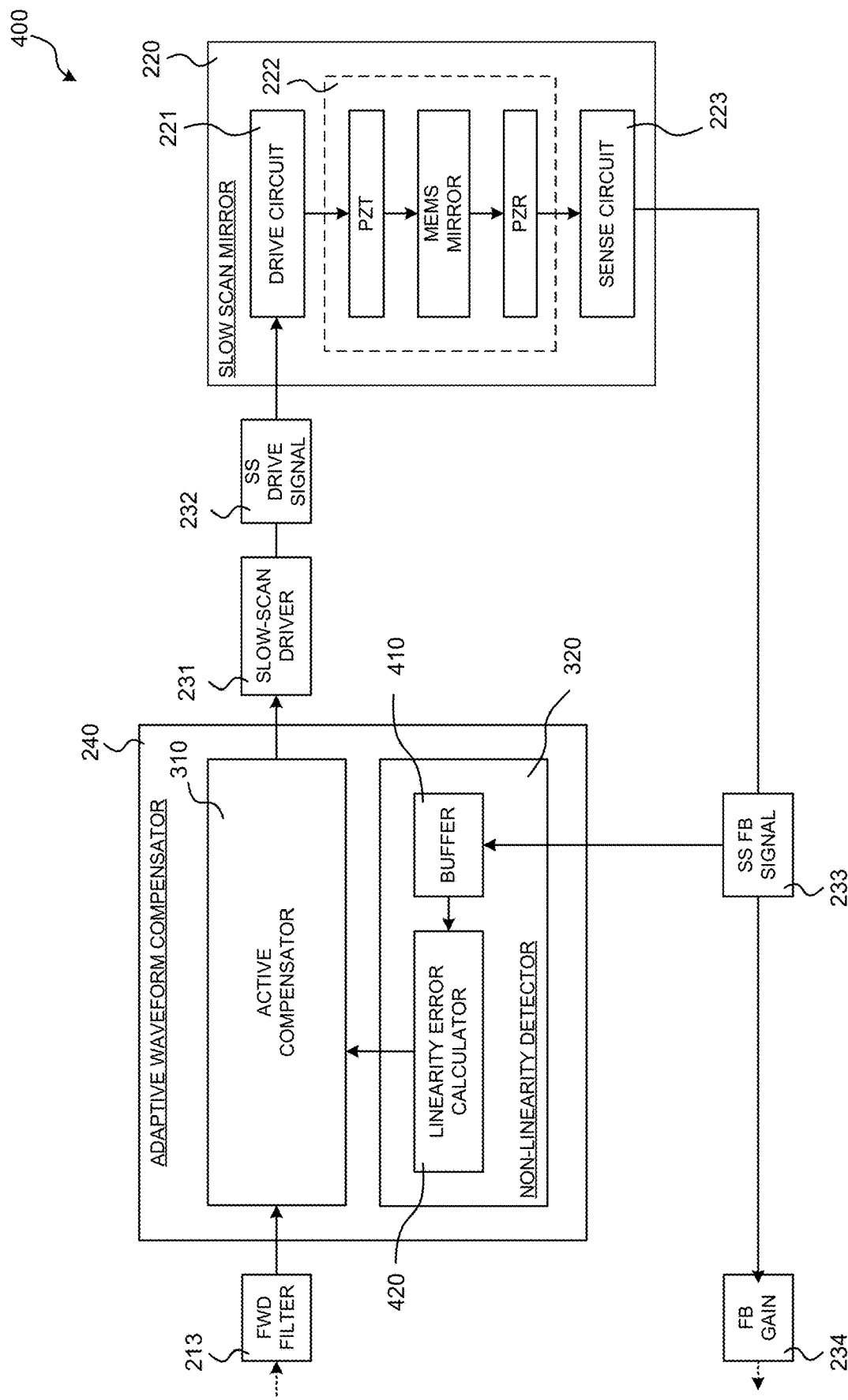
FIG. 4 shows a block diagram of another example beam scanning (LBS) display devices with an adaptive waveform non-linearity compensator.

FIG. 4 illustrates another example adaptive waveform non-linearity compensation topology 400 that may be employed the laser beam scanning (LBS) display device 200 of FIG. 2. As illustrated, the example adaptive waveform compensator block 240 of FIG. 4 includes an active compensator 310, and a non-linearity detector 320.

The non-linearity detector 320 is configured to evaluate the VPZR measurements (which may be digital or analog values) from the SS mirror 220 via the SS FB signal 233. As illustrated, the SS mirror 220 includes a drive circuit 221, a MEMS assembly 222, and a sense circuit 223. The MEMS assembly 222 includes a PZT material, a MEMS mechanical mirror, and a PZR material. The sense circuit 223 is configured to generate measurements signals from the PZR material, which is then provided as at least a portion of the SS FB signal 233.

The non-linearity detector 320 of FIG. 4 further includes a buffer 410 and a linearity error calculator 420. The buffer is configured to receive the SS FB signal 233 and provide a buffered signal. The linearity error calculator 420 is configured to receive the buffered signal from the buffer 410 and provide one or more linearity error signals responsive to the buffered signal. The one or more linearity error signals indicate a non-linearity error that is associated with the SS mirror 220 in one or more regions of operation based on the VPZR measurements for the SS mirror 220 and the corresponding waveform signal.

As discussed previously, the SS FB signal 233 may be implemented as an analog signal or a digital signal. For a digital signal implementation, the buffer 410 may correspond to a data buffer that captures data corresponding to one complete frame of the VPZR measurements from the SS mirror 220. For some analog signal implementations, the buffer may simply be an analog buffer. In other analog signal implementations, an ADC (not shown) may be added before the buffer to convert the SS FB signal 233 into a digital value. Additional filtering, gain, attenuation, and limiting components may also be added to condition the SS FB signal 233 for capture or evaluation, as may be required.

For implementations that include digital signal processing, the one or more linearity error signals may be evaluated and updated periodically. For example, An update rate of about 60 Hz may correspond to one display frame, where the one or more linearity error signals may be updated at that rate (e.g., once per captured frame of VPZR measurements). The linearity error signal update may thus be executed at a periodic rate (e.g., 10 Hz, 15 Hz, 20 Hz, 30 Hz, 60 Hz, 90 Hz, 100 Hz, 120 Hz, etc.), or a multiple of update rates (e.g., averaged data over two frames, three frames, etc. may be used to determine the linearity error). The periodic rate may be determined as some multiple number of frames for the LBS display, e.g. (1x, 2X, 3X, 5X, etc.), and/or by averaging multiple frames (2 frames, 3 frames, 4 frames, 5 frames) of VPZR data and doing a single calculation.

The linearity error calculator 420 is configured to receive the buffered signal (e.g., the VPZR measurements) from the buffer. In some examples, the linearity error calculator 420 may be configured to compute a display ramp from the buffered signal (e.g., based on VPZR measurements), detect linearity deviation (LD) in one or more regions of the display ramp, and generate the one or more a non-linearity error signals based on the detected LD in the one or more regions of the display ramp. In this way, the linearity error calculator can be configured to detect multiple regions of non-linearities in the SS mirror feedback signal and generate error signals that can be processed to correct for the non-linearities region by region.

In some additional examples, the buffer 410 is configured to capture sampled data points associated with the SS mirror from the SS FB signal, where the sampled data points corresponds to at least one frame of VPZR measurements from the SS mirror, which ideally corresponds to a linear ramp signal. The linearity error calculator 420 may also be configured to evaluate the buffered sampled data points associated with the SS mirror, identify a best linear fit ramp signal for the sampled data points between a maximum value and minimum value of the sampled data points, and compare each of the sampled data points to the best linear fit ramp signal to compute a linearity deviation for each sampled data point, and generate the one or more non-linearity error signals based on the computed linearity deviation for each sampled data point.

The linearity error calculator 420 may be configured, in some implementations, such that one or more non-linearity error signals are asserted when the linearity deviation is in a range with a magnitude of about one pixel (+/−1 pixel), about two pixels (+/−2 pixels), about three pixels (+/−3 pixels), or about four pixels (+/−4 pixels), etc.

Figure 5:
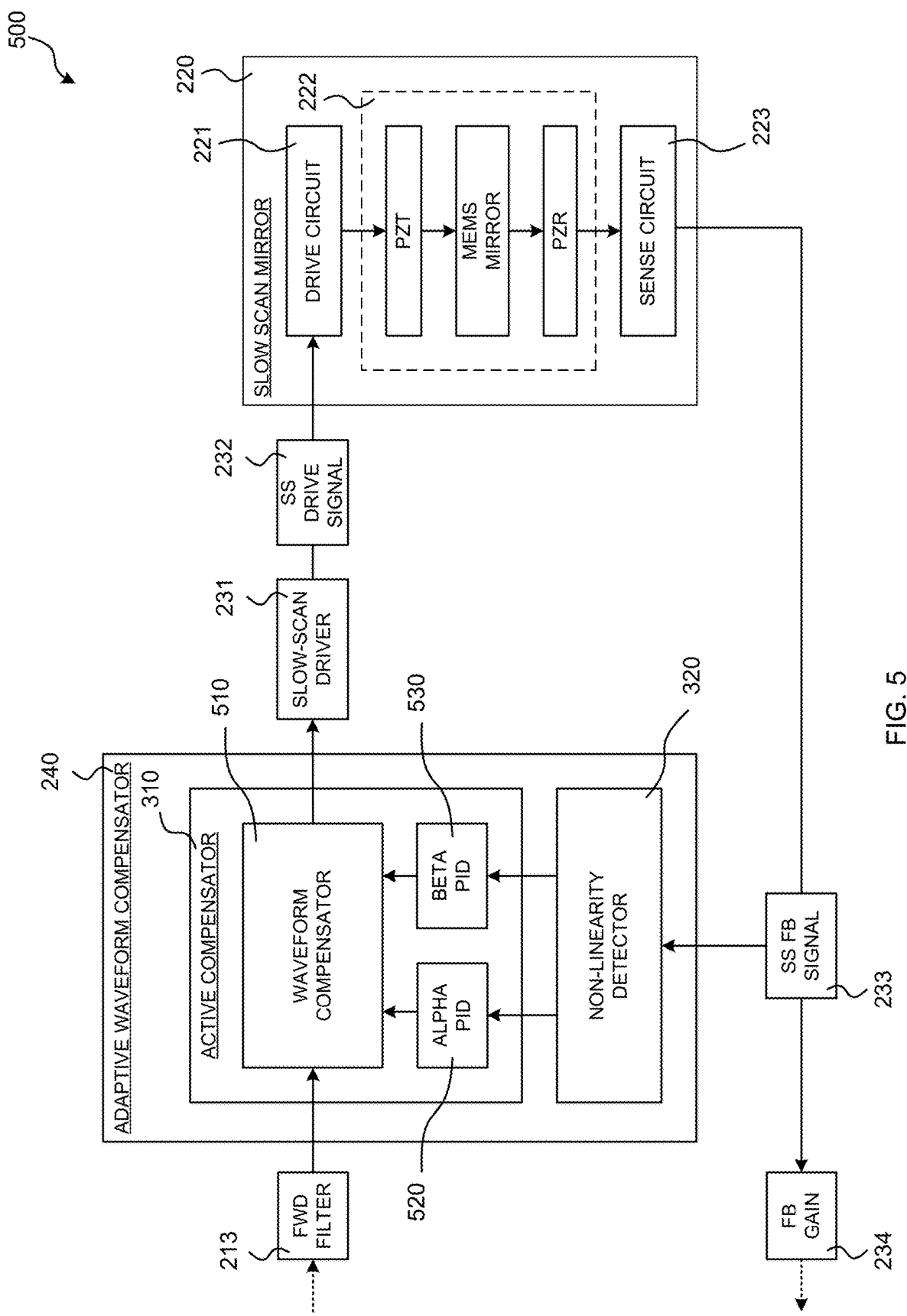
FIG. 5 shows a block diagram of yet another example beam scanning (LBS) display devices with an adaptive waveform non-linearity compensator.

FIG. 5 illustrates another example adaptive waveform non-linearity compensation topology 500 that may be employed the laser beam scanning (LBS) display device 200 of FIG. 2. As illustrated, the example adaptive waveform compensator block 240 of FIG. 5 includes an active compensator 310, and a non-linearity detector 320.

The non-linearity detector 320 is again configured to evaluate the VPZR measurements (which may be digital or analog values) from the SS mirror 220 via the SS FB signal 233, similar to those described with respect to FIGS. 2-4. The active compensator 310 of FIG. 5 further includes a non-linear compensator 510, a first PID controller 520 (e.g., an APLHA PID controller), and a second PID controller 530 (e.g., a BETA PID controller).

The input to the first PID controller 520 corresponds to a first one of the non-linearity error signals from the non-linearity detector 320, while the input to the second PID controller 530 corresponds to a second one of the non-linearity error signals from the non-linearity detector 320. The inputs of the non-linear compensator 510 corresponds to the outputs of the first and second PID controllers 520, 530.

The adaptive waveform compensator 240 of FIG. 5 is configured to adjust a non-linearity compensation parameters (e.g., a first parameter) responsive to the first non-linearity error signal with the first PID controller 520, adjust a second non-linearity compensation parameter (e.g., a second parameter) responsive to the second non-linearity error signal with the second PID controller 530, and adjust the signal waveform of the SS drive signal 233 to pre-distort in one or more regions of the signal waveform based on the first and second non-linearity compensation parameters. The non-linearity compensation parameters may thus be associated with different regions of operation for the SS mirror 220, such that each non-linearity region may have separate waveform adjustments.

Although illustrated as two PID controllers, these are merely examples and any number of PID controllers may be employed to adjust a corresponding non-linearity compensation parameter. For example, if the VPZR measurements captured from an example SS mirror 220 suggests that there are three (or four) non-linearity regions for the SS mirror performance that require compensation, then three (or four) PID controllers may be employed, with each PID controller adjusting a different compensation parameter for a corresponding region of operation. Thus, any number of PID controllers may be employed, with each PID controller being configured to manage a compensation parameter for a corresponding region of operation for the SS mirror. Similarly, the linearity error calculator 420 may be adapted to generate a corresponding linearity error signal for each corresponding PID that manages a region of operation for the SS mirror. The overall objective being to pre-distort the shape of the waveform for the SS drive signal 232 in each region where the SS mirror exhibits a non-linear performance, and thus the results observed on the display device will appear as though no non-linearity exists.

Figure 6:
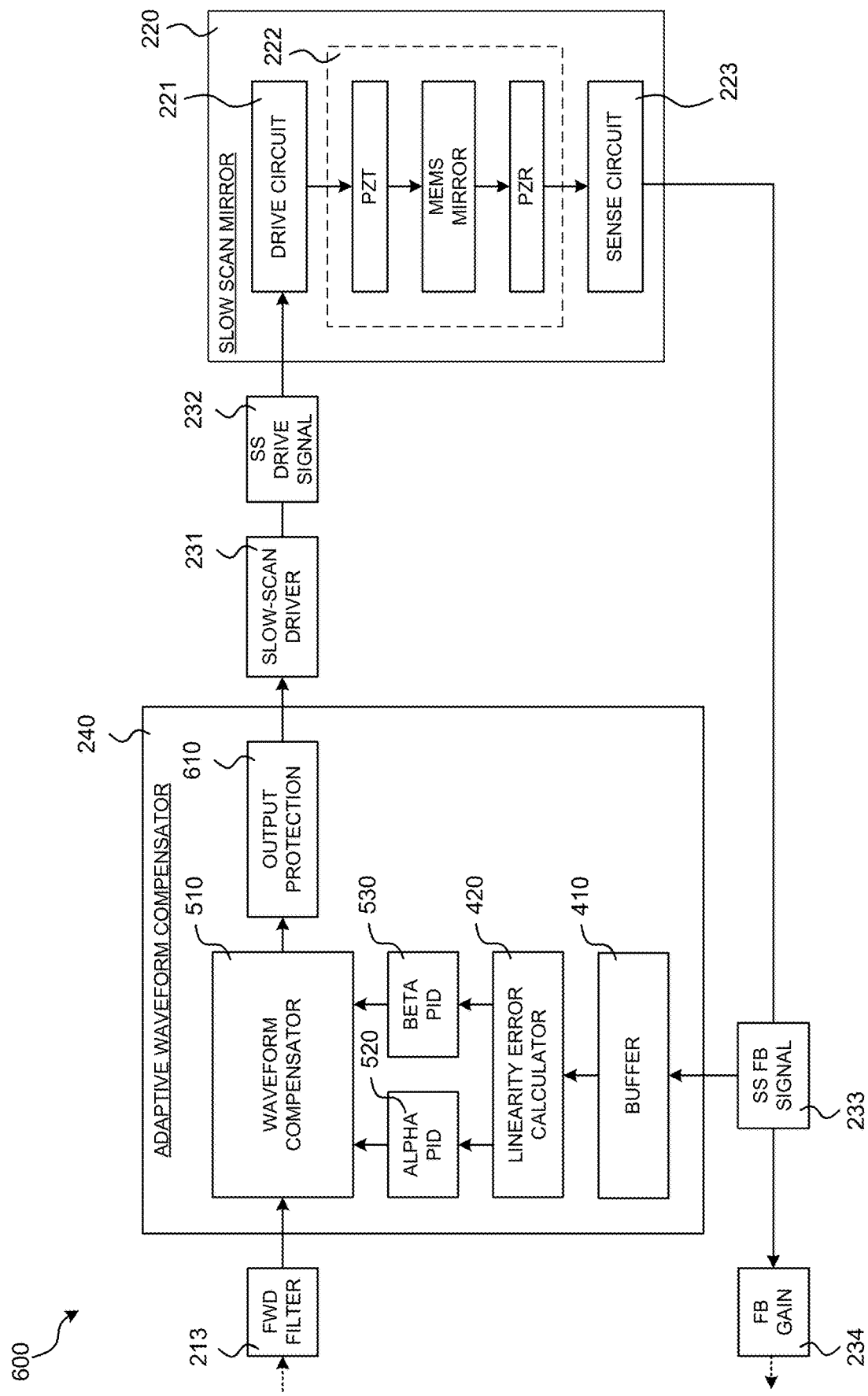
FIG. 6 shows a block diagram of still another example beam scanning (LBS) display devices with an adaptive waveform non-linearity compensator.

FIG. 6 illustrates another example adaptive waveform non-linearity compensation topology 600 that may be employed the laser beam scanning (LBS) display device 200 of FIG. 2. As illustrated, the example adaptive waveform compensator block 240 of FIG. 6 includes a buffer 410, a linearity error calculator 420, a non-linear compensator 510, a first PID controller 520 (e.g., an APLHA PID controller), a second PID controller 530 (e.g., a BETA PID controller), and an optional output protection 610.

The buffer 410 is configured to receive the SS FB signal 233 and provide a buffered signal. The linearity error calculator 420 is configured to receive the buffered signal from the buffer 410 and provide one or more linearity error signals responsive to the buffered signal. The one or more linearity error signals indicate a non-linearity error that is associated with the SS mirror 220 in one or more regions of operation based on the VPZR measurements for the SS mirror 220 and the corresponding waveform signal.

The linearity error calculator 420 is configured to receive the buffered signal (e.g., the VPZR measurements) from the buffer. In some examples, the linearity error calculator 420 may be configured to compute a display ramp from the buffered signal (e.g., based on VPZR measurements), detect linearity deviation (LD) in one or more regions of the display ramp, and generate the one or more a non-linearity error signals based on the detected LD in the one or more regions of the display ramp. In this way, the linearity error calculator can be configured to detect multiple regions of non-linearities in the SS mirror performance, and generate error signals that can be processed to correct for the non-linearities region by region.

As discussed previously, the buffer 410 may be configured to capture sampled data points associated with the SS mirror from the SS FB signal, where the sampled data points corresponds to at least one frame of VPZR measurements from the SS mirror, which ideally corresponds to a linear ramp signal. The linearity error calculator 420 may be configured to evaluate the buffered sampled data points associated with the SS mirror, identify a best linear fit ramp signal for the sampled data points between a maximum value and minimum value of the sampled data points, and compare each of the sampled data points to the best linear fit ramp signal to compute a linearity deviation for each sampled data point, and generate the one or more non-linearity error signals based on the computed linearity deviation for each sampled data point.

The linearity error calculator 420 may be configured to evaluate the VPZR measurements (which may be digital or analog values) from the SS mirror 220 via the SS FB signal 233, similar to those described with respect to FIGS. 2-5.

The input to the first PID controller 520 corresponds to a first one of the non-linearity error signals from the linearity error calculator 420, while the input to the second PID controller 530 corresponds to a second one of the non-linearity error signals from the linearity error calculator 420. The inputs of the non-linear compensator 510 corresponds to the outputs of the first and second PID controllers 520, 530.

Similar to that discussed previously with respect to FIGS. 2-5, the adaptive waveform compensator 240 of FIG. 6 is configured to one or more non-linearity compensation parameters (e.g., a first parameter for a first PID, a second parameter for a second PID, etc.) responsive to the corresponding non-linearity error signals and PID controllers, so that the signal waveform of the SS drive signal 233 is adjusted to pre-distort in one or more regions based on the corresponding non-linearity compensation parameters.

Although illustrated as two PID controllers, these are merely examples and any number of PID controllers may be employed to adjust a corresponding non-linearity compensation parameter. For example, if the VPZR measurements captured from an example SS mirror 220 suggests that there are three (or four) non-linearity regions for the SS mirror performance that require compensation, then three (or four) PID controllers may be employed, with each PID controller adjusting a different compensation parameter for a corresponding region of operation. Thus, any number of PID controllers may be employed, with each PID controller being configured to manage a compensation parameter for a corresponding region of operation for the SS mirror. Similarly, the linearity error calculator 420 may be adapted to generate a corresponding linearity error signal for each corresponding PID that manages a region of operation for the SS mirror. The overall objective being to pre-distort the shape of the waveform for the SS drive signal 232 in each region where the SS mirror exhibits a non-linear performance, and thus the results observed on the display device will appear as though no non-linearity exists.

The optional output protection 610 is inserted between the output of non-linear compensator 510 and the slow-scan driver 231. The output protection 610 is an optional block that may be utilized in some implementations where the SS drive signal 232 should be limited to prevent damage to the SS mirror 220, as well as other system components. The output protection may also be provided by an algorithmically limited value inside the SS controller or eliminated when not needed.

The SS controller and other components of FIGS. 1-6 can be implemented using a number of technologies. For example, embodiments can be implemented using software/firmware (e.g., DSP, digital Si logic, FPGA, firmware, etc.), or hardware (PCB board with discrete components), or a combination of hardware and software. For example, the filters in FIG. 2 may be implemented using analog filters, wherein the poles and zeros may be adjusted by using appropriate resistors, capacitors, and other components. In another example the filters in FIG. 2 may be implemented using one or more DSP chips or embedded CPUs. The various components may be soldered on a single PCB, or a set of boards.

In the various examples, PID controllers are described. PID controllers continuously calculate an error value, e(t), which corresponds to a difference between a desired set point, r(t), and a measured process variation, y(t). Thus, the error value e(t) for PID controllers may be given as e(t)=r(t)−y(t). The PID controller is typically configured to provide an output signal, u(t), that is based on the error value, e(t) using a set of proportional, integral, and derivative coefficients (denoted $K_P$, $K_I$, and $K_D$ respectively). The correction signal, u(t), for a PID controller can generally be given as:

$$u(t) = K_P e(t) + K_I \int_0^t e(t)dt + K_D \frac{de(t)}{dt} \quad \text{(Eq. 2)}$$

The proportional (P) term in this equation, $K_P*e(t)$, is proportional to the current value of the error from the set point, e(t), times the gain scaling factor set by the coefficient $K_P$. When there is no error, e(t)=0 and there is no corrective response. The integral (I) term accounts for past values of the error, e(t), integrated or accumulated over time. For example, when there is a residual error after the application of the proportional (P) control term, (e.g., an error that may lag in time after the new P term is applied), the integral term counteracts this residual error by adding a control term for the cumulative value of the error over a time interval, gain scaled by the coefficient $K_I$. When the error e(t) reaches zero, the integral term will cease to grow since no additional error will accumulate. The differential (D) term corresponds to an estimate of the error, based on the rate of change of the error over time, gain scaled by the coefficient $K_D$. For a rapid change in error, the damping applied by the differential term will be greater. The tuning of the coefficients ($K_P$, $K_I$, $K_D$) can be determined using any variety of tuning methods, manual or algorithmic, that consider the output of the SS mirror (e.g., the SS FB signal), the gain needed for the system, along with any other parameters such as update rate, frame rate of the LBS device, etc.

In one example, a system parameter the set point, r(t), may correspond to the ideal curve for the ramp signal, and the error signal, e(t), may correspond to the currently detected linearity error. In this example, the PID controller may apply the coefficients ($K_P$, $K_I$, $K_D$) to these conditions and output a correction signal, u(t), which may correspond to a feedback scaling factor to be combined with overall gain of the feedback loop.

In one example, an alpha PID controller 520 may receive a first error signal, $e_1(t)$, from the non-linearity detector 320, and output a first correction signal, $u_1(t)$, which corresponds to an alpha coefficient; and the beta PID controller 530 may receive a second error signal, $e_2(t)$, from the non-linearity detector 320, and output a first correction signal, $u_2(t)$, which corresponds to a beta coefficient. These alpha and beta coefficients may be utilized as inputs to the waveform compensator 510, which may then adjust (e.g., offset either positively or negatively) the points in the waveform for the slow scan drive signal 232.

In some examples, the evaluation of the alpha and beta coefficients by the waveform compensator 510 to determine the precise adjustment to the waveform may be accomplished with a look-up table. In other examples, the evaluation of the alpha and beta coefficients by the waveform compensator 510 to determine the precise adjustment to the waveform may be accomplished with a calculation or function that is responsive to the coefficients (e.g., a Taylor series of the inverse of the non-linearity function, see FIG. 12C for an example inverse function).

An example representation of a waveform may have the general form of y=f(x). For an ideal ramp, this waveform is generally of the form y=x. However, when a non-linearity occurs in the slow-scan feedback signal (e.g., the VPZR measurements indicate a non-linearity), the waveform function may be of the general form:

$$y=ax+bx^2+cx^3+\ldots \quad \text{(Eq. 3)}$$

where a, b, c . . . are constants that may be positive or negative or zero.

The adaptive waveform compensator 240 will calculate, for each point of the signal waveform for the slow-scan drive signal, a linearity difference between the ideal ramp and the non-linear signal. The compensation to be applied will be generally of the form that is an inverse of this linearity difference, at the specific point. Thus for a points of the slow-scan feedback signal that are below the ideal ramp curve, a positive offset will be applied to the slow-scan drive signal waveform, and for points above the ideal ramp curve, a negative offset will be applied to the slow-scan drive signal waveform. However, the precise calculation that is necessary may be complex. FIG. 12A-12C illustrate an example of the SS feedback signal, linearity difference (or error), and an inverse of the SS feedback signal that may be utilized to adjust the slow-scan drive signal.

In some embodiments, the periodic rate of updating the waveform may be determined relative to some multiple number of frames for the LBS display. For example, the waveform adjustment could occur once for each frame (e.g., frame rate/1, ×1), once every other frame (e.g., frame rate/2, ×½), once every third frame (e.g., frame rate/3, or ×⅓), etc. The design may be any multiple of the frame rate for the LBS display device (×1, ×½, ×⅓, ×¼, ×⅕, ×1/10, . . . ), as long as the desired system performance requirements may be met. Such a periodic rate may have some benefits such as a damped response with reduced overshooting, preventing oscillation in the gain, etc.

In some additional embodiments, multiple frames may be averaged over an interval before an adjustment is made. For example, the waveform adjustment could occur after two frames are averaged (e.g., frame rate/2), an average of three frames (e.g., frame rate/3), etc. Again, the design is not limited and may average any number, as long as the desired system performance requirements may be met. In a specific example, the VPZR measurement values for the individual pixels may be averaged over multiple frames during an interval, where the gain adjustments are made using the averaged pixel values. The averaged values may be used to smooth out the gain adjustment and provide a damped response with reduced overshooting, preventing oscillation in the gain, etc.

Figure 14:
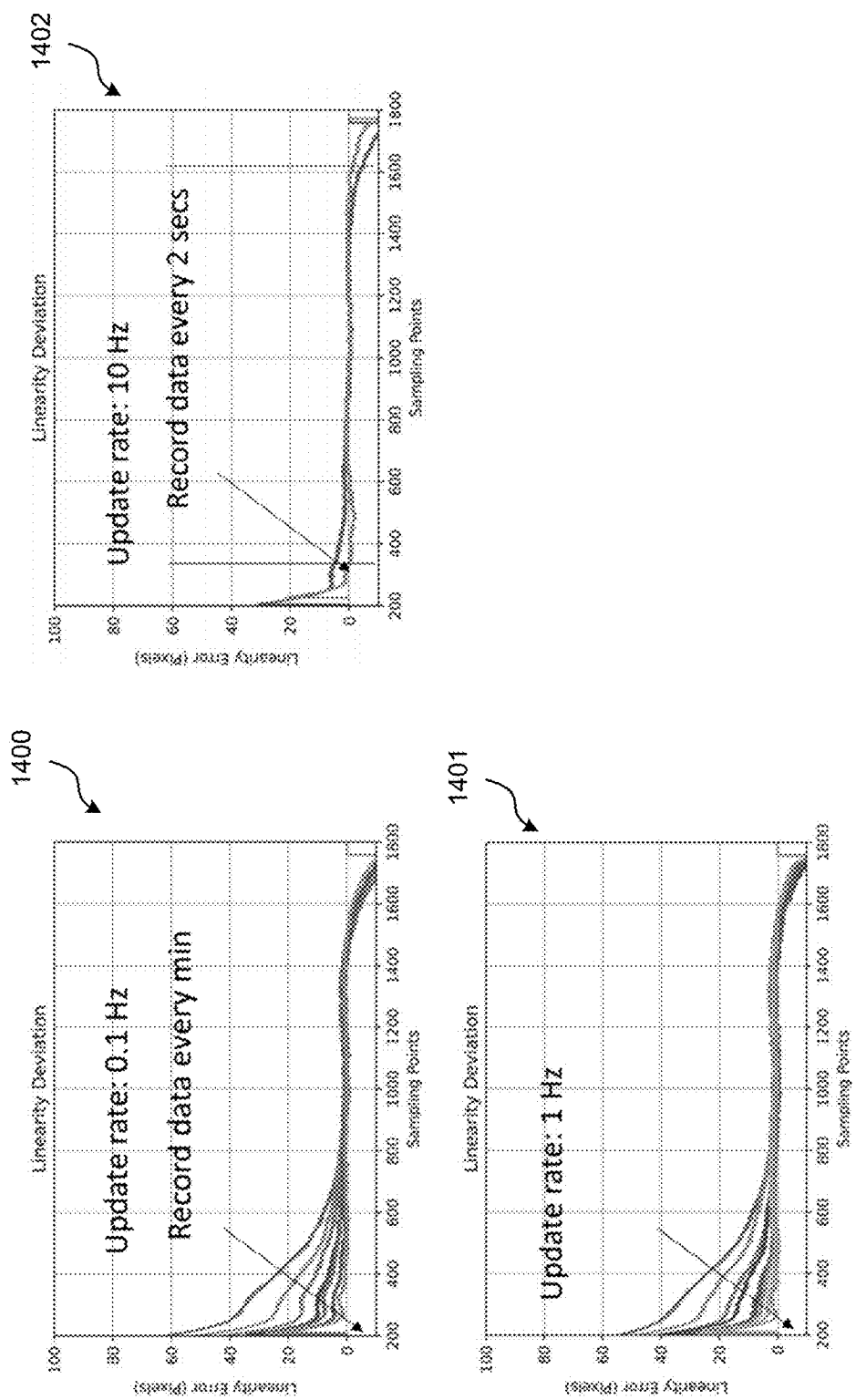
FIG. 14 shows a set of graphs illustrating example update rates for waveform adjustments that may be utilized for adaptive waveform compensation.

FIG. 14 shows a set of graphs illustrating example update rates for waveform adjustments that may be utilized for adaptive waveform compensation. As illustrated, Graph 1400 has an update rate of 0.1 Hz, while Graph 1401 has an update rate of 1 Hz, and Graph 1402 has an update rate of 10 Hz. For each graph, the individual curves correspond to samples of the data captured over a specific time interval. Graph 1400 has a curve representing data captured once every minute; while Graphs 1401 and 1402 have curves representing data captured once 2 seconds. For Graph 1400, the linearity deviation is reduced with each curve, and converges to a solution of about zero linearity deviation in about 7 minutes of time of elapsed time. For Graph 1401, the linearity deviation is reduced with each curve and converges to a solution of about zero linearity deviation in about 20 seconds of elapsed time. For Graph 1402, the linearity deviation is reduced with each curve and converges to a solution of about zero linearity deviation in less than about 2 seconds of elapsed time. Thus, it is observed that the reduced linearity may have a damped response that is determined based on the update rate.

FIGS. 7-11 show flowcharts of various example methods to detect non-linearities and adjust a waveform shape of the SS drive signal of the inner control loop to compensate for the detected non-linearities in the slow-scan feedback signal from a slow-scan mirror of a laser beam scanning display device.

Figure 7:
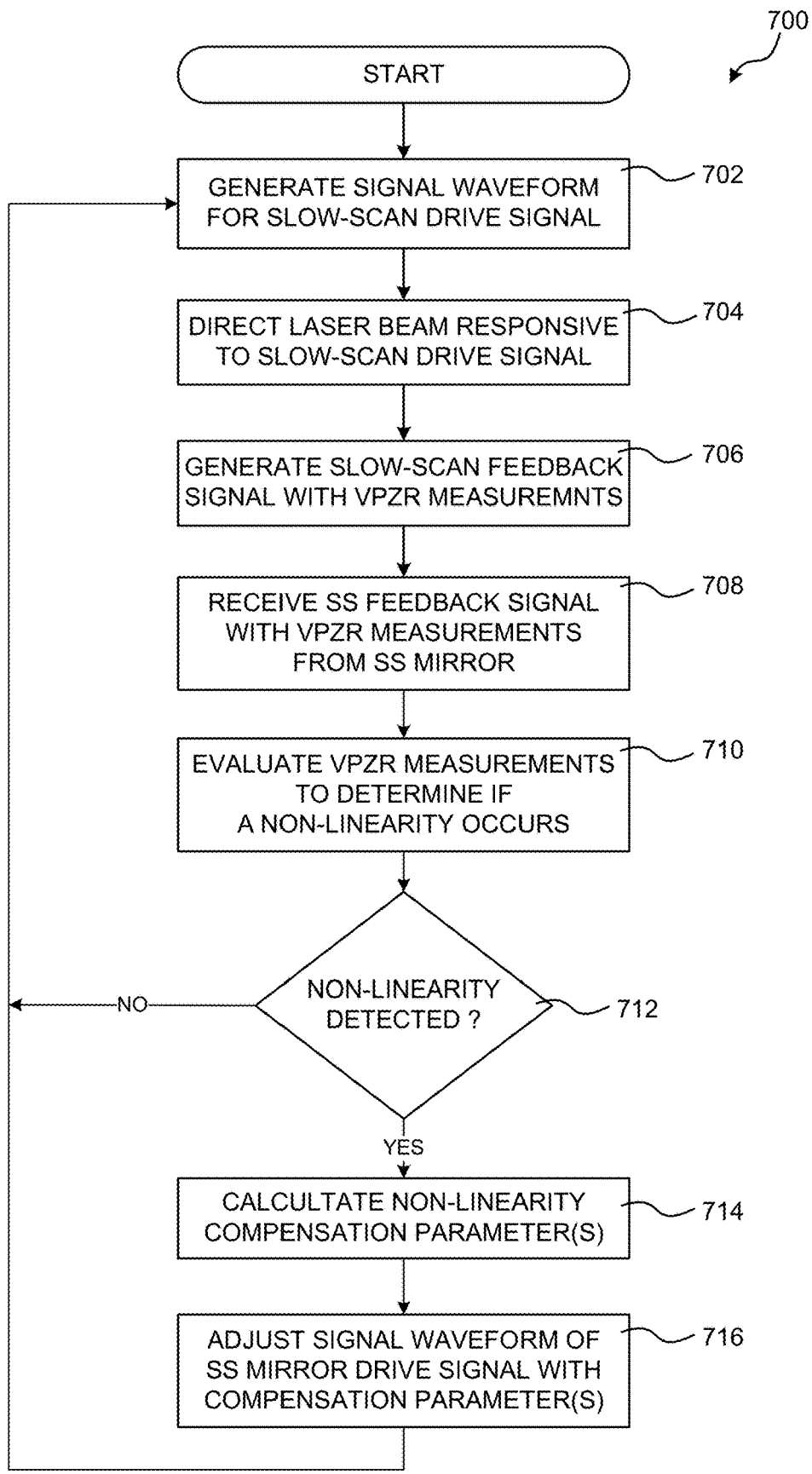
FIG. 7 is a flow diagram showing a method that illustrates adaptive waveform non-linearity compensation of an example LBS system.
Figure 8:
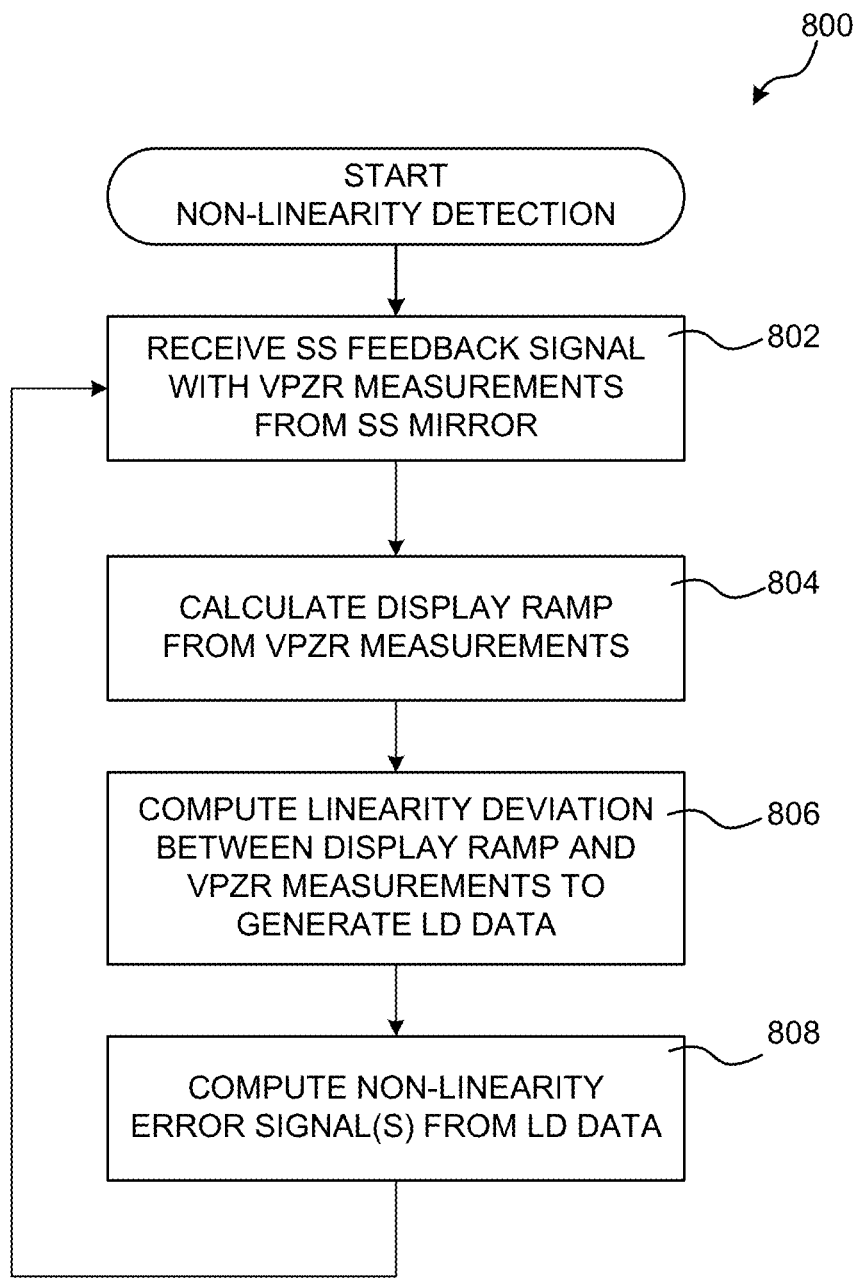
FIG. 8 is a flow diagram showing a method that illustrates non-linearity detection aspects of an example LBS system.
Figure 9:
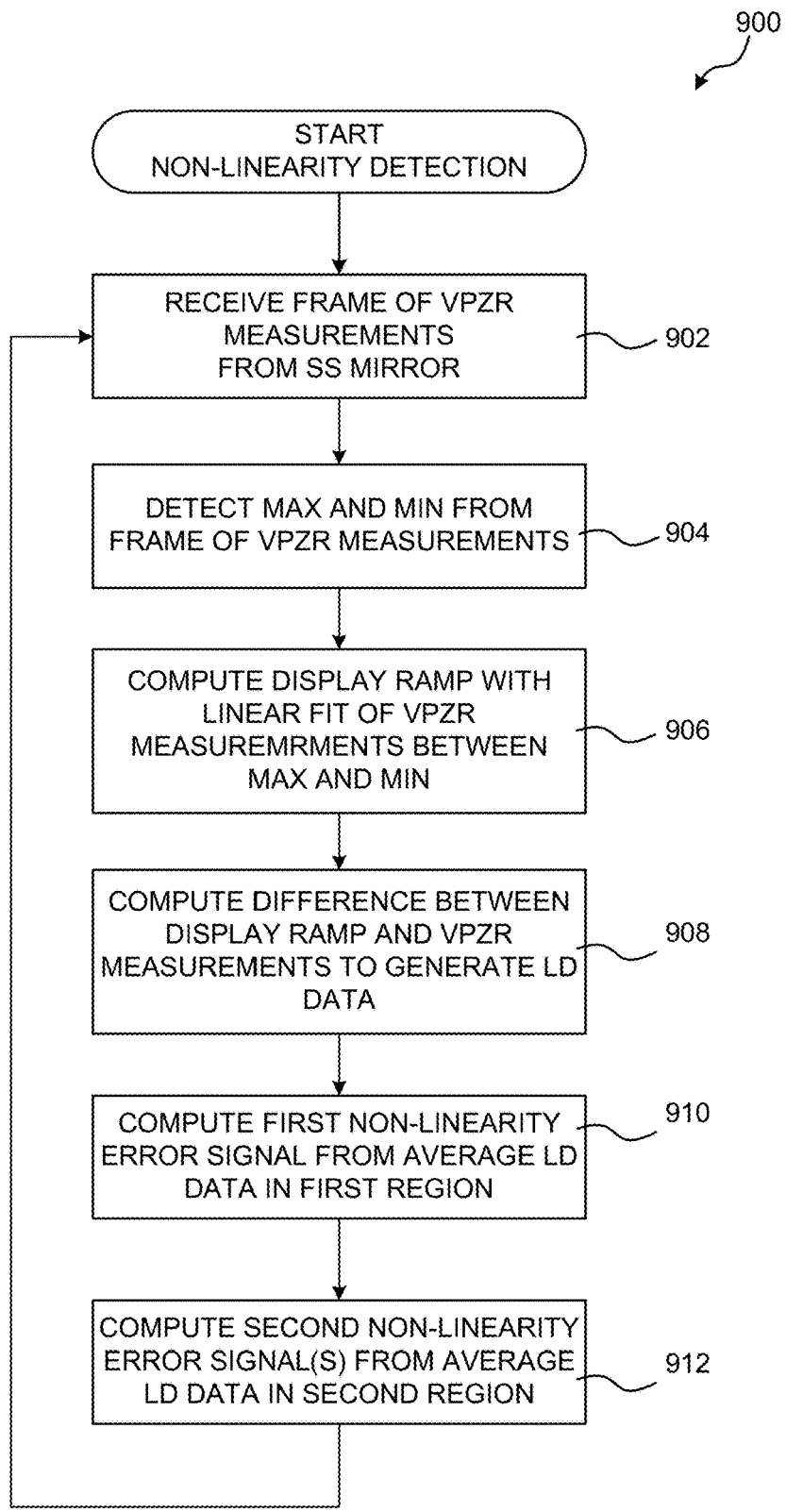
FIG. 9 is a flow diagram showing another method that illustrates non-linearity detection aspects of an example LBS system.
Figure 10:
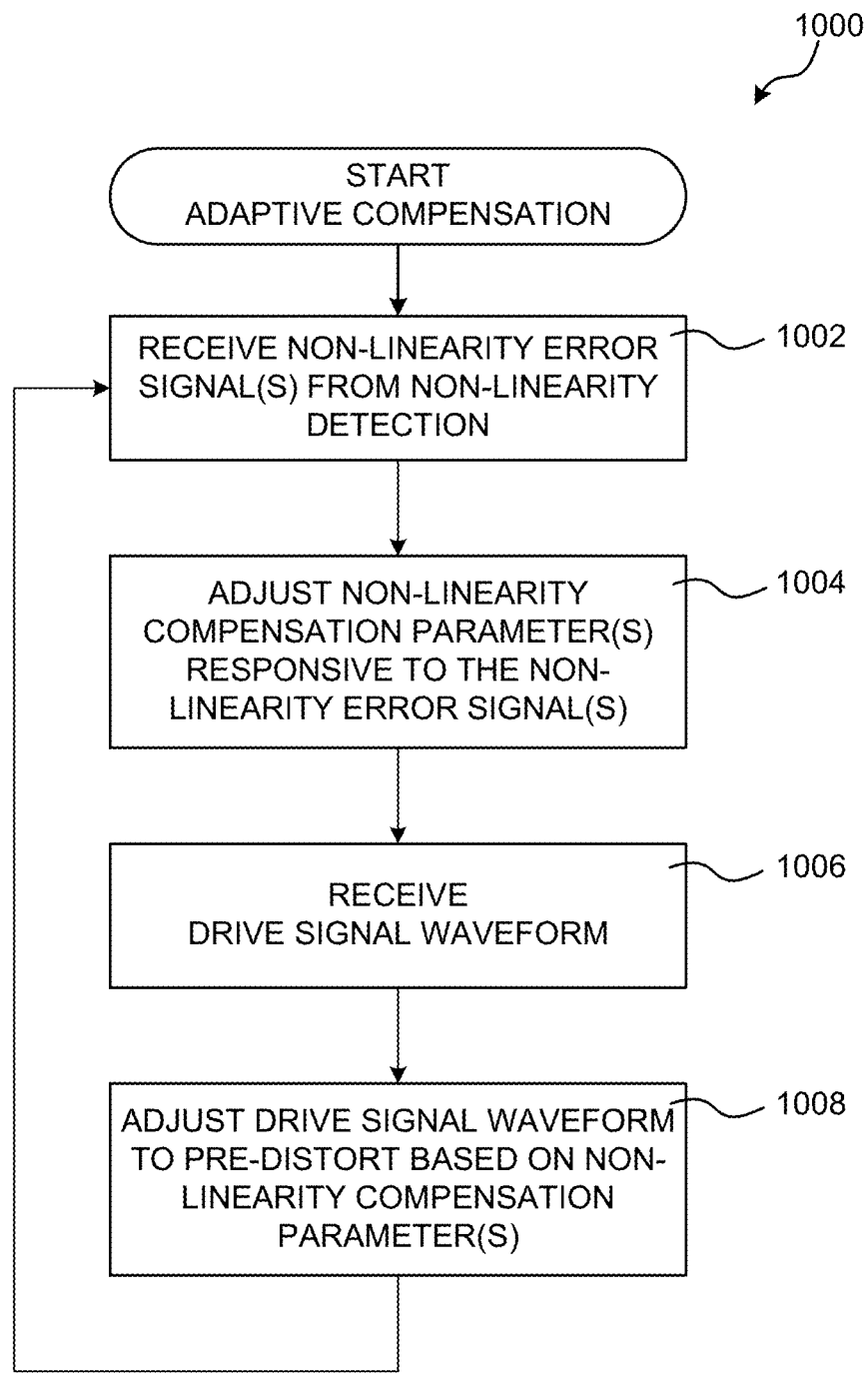
FIG. 10 is a flow diagram showing a method that illustrates adaptive compensation of an example LBS system.
Figure 11:
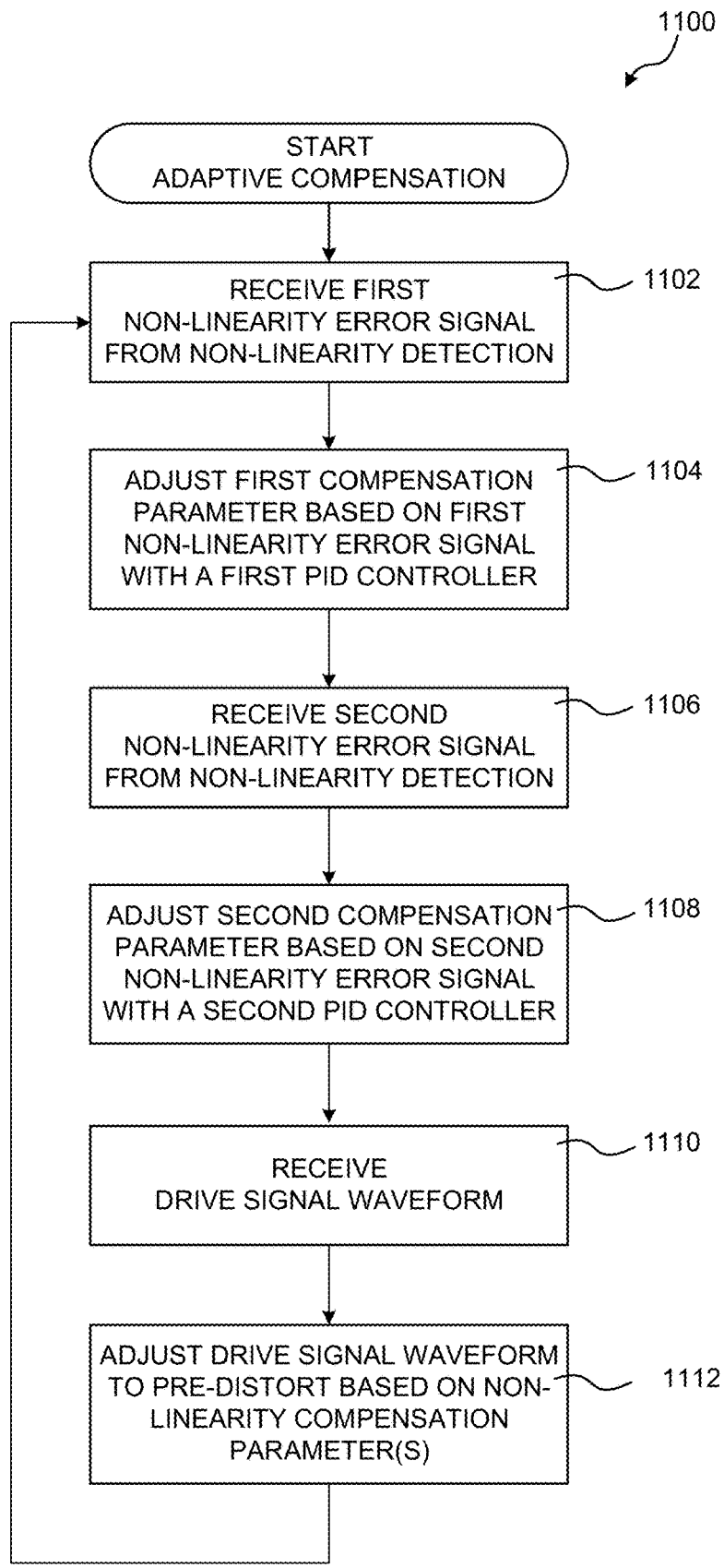
FIG. 11 is a flow diagram showing another method that illustrates adaptive compensation of an example LBS system.

FIG. 7 is a flow diagram showing a method 700 that illustrates aspects of an LBS system or display device with adaptive waveform non-linearity compensation, which was as described above with reference to FIGS. 1-6, in according various embodiments disclosed herein. It should be appreciated that the particular implementation of the technologies disclosed herein is a matter of choice dependent on the performance and other requirements of the computing device. Accordingly, the logical operations described herein are referred to variously as states, operations, structural devices, acts, or modules.

These states, operations, structural devices, acts and modules can be implemented in hardware, software, firmware, in special-purpose digital logic, and any combination thereof. It should be appreciated that more or fewer operations can be performed than shown in the FIGS. and described herein. These operations may also be performed in a different order than those described herein.

Method 700 begins at operation 702, where the slow-scan controller generates a signal waveform for a slow-scan drive signal 232 to drive a slow-scan mirror 220. Method 700 proceeds from operation 702 to operation 704, where a laser beam is directed (e.g., reflected) to a display region 140 of a display device to display an image, wherein the beam deflection angle of the laser beam is responsive to the slow-scan drive signal 232. Method 700 proceeds from operation 704 to operation 706, where the slow-scan mirror 220 generates a slow-scan feedback signal 233 that includes VPZR measurements associated with the SS mirror 220 (e.g., a signal from the sense circuit 223, which senses the PZR of the SS mirror 220). Method 700 proceeds from operation 706 to operation 708, where the slow-scan controller 210 receives the slow scan feedback signal 233 that includes VPZR measurements from the slow-scan mirror 220. Method 700 proceeds from operation 708 to operation 710, where slow scan controller 210 evaluates the VPZR measurements from the slow-scan feedback signal 233 to identify a non-linearity characteristic in the slow-scan feedback signal 233. Method 700 proceeds from operation 710 to operation 712, where a decision is made based on operation 710. When no non-linearity characteristic is detected at operation 710, processing flows from operation 712 to operation 702 where the process begins again. When a non-linearity characteristic is detected at operation 710, processing flows from operation 712 to operation 714. At operation 714, the slow scan controller 210 calculates one or more non-linearity compensation parameters associated with the signal waveform based on the VPZR measurements. Method 700 proceeds from operation 7!4 to operation 7!6, where the slow-scan controller 210 adjusts the signal waveform for the slow-scan drive signal 232 is adjusted with the one or more compensation parameters from operation 714, such that the slow-scan drive signal 232 is pre-distorted to compensate for the identified non-linearity characteristic in the slow-scan feedback signal 233. Method 700 may continue from operation 716 to operation 702, where the process may begin again.

In some examples, a display device is described that includes an adaptive waveform compensator (240), such as from FIGS. 1-6. The adaptive waveform compensator may thus be configured to evaluate the VPZR measurements (710) to detect a non-linearity in the slow-scan mirror (712) from the slow-scan feedback signal (233), calculate a non-linear compensation parameter (714) when the non-linearity is detected, and adjust the signal waveform of the slow-scan drive signal (716) with the calculated non-linear compensation parameter.

Method 800 illustrates an example non-linearity detection process that may be employed in the various examples described with respect to FIGS. 1-7. Method 800 begins at operation 802, where the slow-scan controller 210 receives the slow scan feedback signal 233 that includes VPZR measurements from the slow-scan mirror 220. Method 800 proceeds from operation 802 to operation 804, where slow scan controller 210 calculates a display ramp with the VPZR measurements from the slow-scan mirror (220). Method 800 proceeds from operation 804 to operation 806, where the slow-scan controller 210 computes a linearity deviation between the calculated display ramp and the VPZR measurements to generate LD data. Method 800 proceeds from operation 806 to operation 808 to operation 802, where the process begins again.

In some examples of method 800, an adaptive waveform compensator 240 from any of FIGS. 1-6 may be configured to receive VPZR measurements from the slow-scan feedback signal 233, calculate a display ramp from the received VPZR measurements, compute a difference between the calculated display ramp and the VPZR measurements to generate linearity deviation (LD) data, and compute one or more non-linearity error signals from the LD data. The waveform of the slow-scan drive signal 233 may be thus dynamically adjusted responsive to the one or more non-linearity error signals.

Method 900 illustrates an example non-linearity detection process that may be employed in the various examples described with respect to FIGS. 1-6. Method 900 begins at operation 902, where the slow-scan controller 210 receives the slow-scan feedback signal 233 that includes VPZR measurements from the slow-scan mirror 220. Method 900 proceeds from operation 902 to operation 904, where slow-scan controller 210 detects a maximum value and a minimum value associated with a frame of VPZR measurements. Method 900 proceeds from operation 904 to operation 906, where slow-scan controller 210 computes a display ramp with a linear fit of VPZR measurements between the maximum value and minimum value of operation 906. Method 900 proceeds from operation 906 to operation 908, where slow-scan controller 210 computes a difference between the linear ramp of operation 906 and the VPZR measurements between the maximum value to generate linearity deviation (LD) data. Method 900 proceeds from operation 908 to operation 910, where slow-scan controller 210 computes a first non-linearity error signal from the average LD data for a first region associated with the slow-scan feedback signal 233. Method 900 proceeds from operation 910 to operation 912, where slow-scan controller 210 computes a second non-linearity error signal from the average LD data for a second region associated with the slow-scan feedback signal 233.

In some examples of method 900, an adaptive waveform compensator 240 from any of FIGS. 1-6 may be configured to receive a frame of VPZR measurements from the slow-scan feedback signal, detect a maximum and minimum associated with the received frame of VPZR measurements, compute a display ramp as a linear fit of the received VPZR measurements between the detected maximum and minimum, compute a difference between the display ramp and the VPZR measurements to generate linearity deviation (LD) data, and compute one or more non-linearity error signals based on the LD data, where the signal waveform of the slow-scan drive signal (233) is dynamically adjusted responsive to the one or more non-linearity error signals.

In some additional examples of method 900, an adaptive waveform compensator 240 from any of FIGS. 1-6 may be configured to the compute the one or more non-linearity error signals as a first non-linearity error signal from average LD data in a first region of the display ramp and a second non-linearity error signal from average LD data in a second region of the display ramp.

Method 1000 illustrates an example adaptive compensation process that may be employed in the various examples described with respect to FIGS. 1-6. Method 1000 begins at operation 1002, where the slow-scan controller 210 receives the non-linearity error signal(s) from the non-linearity detector. Method 1000 proceeds from operation 1002 to operation 1004, where the slow-scan controller 210 adjusts the non-linearity compensation parameters responsive to the non-linearity error signal(s). Method 1000 proceeds from operation 1004 to operation 1006, where the slow-scan controller 210 receives the signal waveform. Method 1000 proceeds from operation 1006 to operation 1008, where the slow-scan controller 210 adjusts the drive signal waveform to pre-distort based on the non-linearity compensation parameters from operation 1004.

As described previously, the drive signal waveforms may be adjusted with the one or more non-linearity compensation parameters, where each of the one or more non-linearity compensation parameters corresponds to a different region of the drive signal waveform that is associated with the corresponding non-linearity characteristic of the slow-scan feedback signal 233.

In some examples of method 900, an adaptive waveform compensator 240 from any of FIGS. 1-6 may be configured to adjust one or more non-linearity compensation parameters responsive to the one or more non-linearity error signals, and adjust the signal waveform of the slow-scan drive signal to pre-distort in one or more regions of the signal waveform based on the one or more non-linearity compensation parameters.

Method 1100 illustrates an example adaptive compensation process that may be employed in the various examples described with respect to FIGS. 1-6. Method 1100 begins at operation 1102, where the slow-scan controller 210 receives a first non-linearity error signal from a non-linearity detection. Method 1000 proceeds from operation 1002 to operation 1004, where the slow-scan controller 210 adjusts a first compensation parameter based on the first non-linearity error signal with a first PID controller. Method 1100 proceeds from operation 1104 to operation 1106, where the slow-scan controller 210 receives a second non-linearity error signal from a non-linearity detection. Method 1100 proceeds from operation 1106 to operation 1108, where the slow-scan controller 210 adjusts a second compensation parameter based on the second non-linearity error signal with a second PID controller. Method 1100 proceeds from operation 1108 to operation 1110, where the slow-scan controller 210 receives the drive signal waveform. Method 1100 proceeds from operation 1110 to operation 1112, where the slow-scan controller 210 adjusts the drive signal waveform to pre-distort based on the non-linearity compensation parameters from operations 1104 and 1108.

As described previously, the drive signal waveforms may be adjusted with the one or more non-linearity compensation parameters, where each of the one or more non-linearity compensation parameters corresponds to a different region of the drive signal waveform that is associated with the corresponding non-linearity characteristic of the slow-scan feedback signal 233.

In some examples of method 1100, an adaptive waveform compensator 240 from any of FIGS. 1-6 may be configured to adjust one or more non-linearity compensation parameters responsive to a first of the one or more non-linearity error signals with a first PID controller, adjust one or more non-linearity compensation parameters responsive to a second of the one or more non-linearity error signals with a second PID controller, and adjust the signal waveform of the slow-scan drive signal to pre-distort in one or more regions of the signal waveform based on the one or more non-linearity compensation parameters.

In some additional examples of method 1100, an active compensator may include a first PID controller configured to adjust a first non-linearity compensation parameters responsive to a first of the one or more non-linearity error signals, a second PID controller configured to adjust a second non-linearity compensation parameters responsive to a second of the one or more non-linearity error signals; and a non-linear compensator configured to adjust the signal waveform of the slow-scan drive signal to pre-distort based on one or more of the first and second non-linearity compensation parameters. The first and second non-linearity compensation parameters may each be associated with a respective region of the signal waveform.

In another example of method 1100, a slow-scan controller is configured to adjust, with a first PID controller, a first compensation parameters associated with the signal waveform based on the first non-linearity error signal; adjust, with a second PID controller, a second compensation parameters associated with the signal waveform based on the second non-linearity error signal; and adjust, with a non-linear compensator, the signal waveform for a slow-scan drive signal to pre-distort based on the first and second compensation parameters. The first compensation parameter is associated with a first non-linearity characteristic of the slow-scan feedback signal in a first region of the frame of VPZR measurements. The second compensation parameter is associated with a second non-linearity characteristic of the slow-scan feedbacks signal in a second region of the frame of VPZR measurements. The drive signal waveform is compensated for the detected non-linearity characteristics of the slow-scan feedback signal in the identified first and second regions associated with the frame of VPZR measurements.

The disclosed embodiments can be implemented using a number of technologies. For example, embodiments can be implemented using software/firmware (e.g., DSP, digital Si logic, FPGA, firmware, etc.), or hardware (PCB board with discrete components), or a combination of hardware and software. For example, the filters in FIG. 2 may be implemented using analog filters, wherein the poles and zeros may be adjusted by using appropriate resistors, capacitors, and other components. In another example the filters in FIG. 2 may be implemented using one or more DSP chips or embedded CPUs. The various components may be soldered on a single PCB, or a set of boards.

Figure 15:
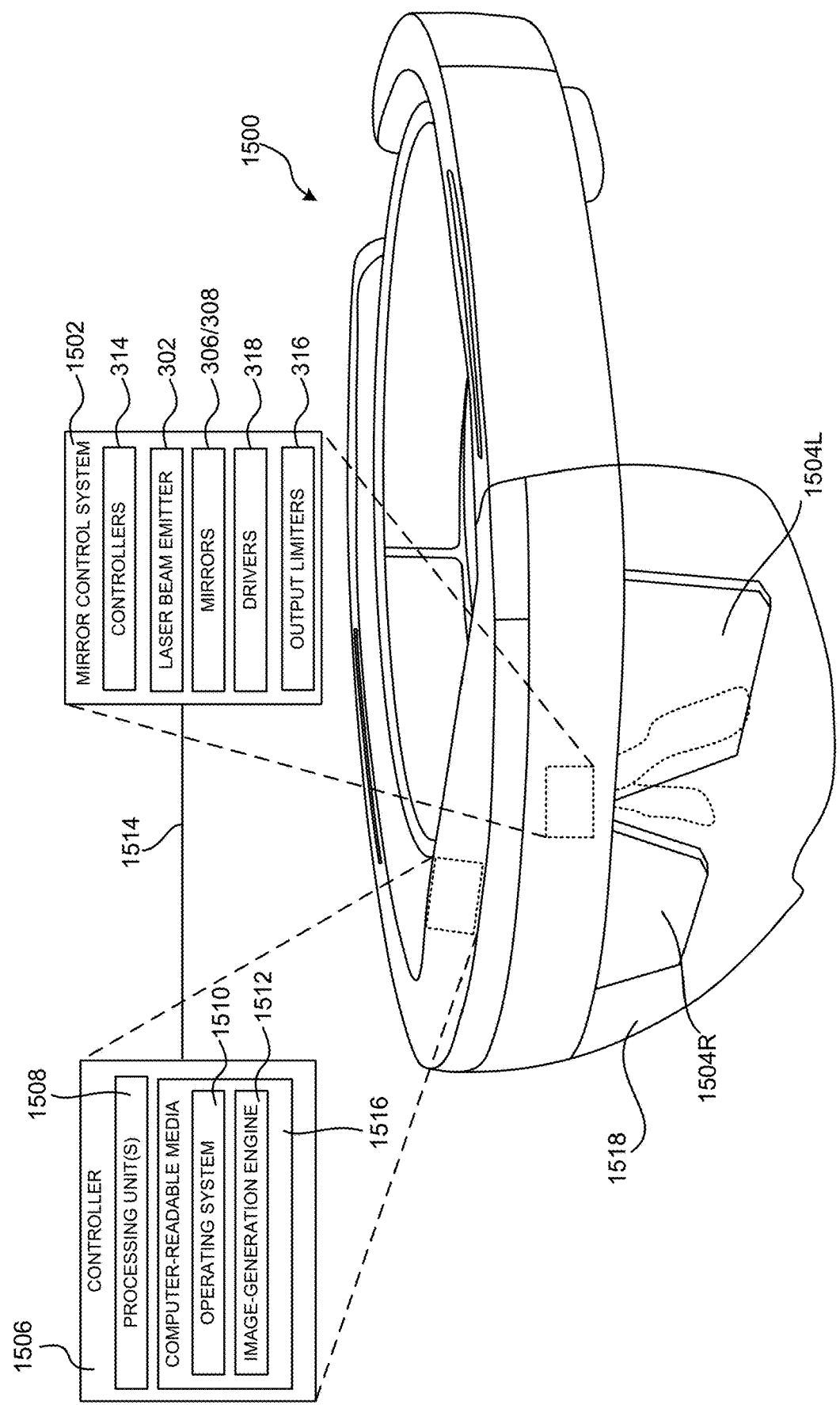
FIG. 15 shows the display device in the form of a head-mounted display device.

FIG. 15 shows the display device in the form of a head-mounted display device. The head-mounted display may be a near-eye display ("NED") device 1500 that includes a mirror control system 1510 implementing aspects of the technologies disclosed herein. The mirror control system 1510 includes the laser beam emitter 1514, mirrors 1516 and 1518, and controllers 1512. Similar components were described in detail above with regard to FIGS. 1-14.

In some examples, the NED device 1500 may utilize the mirror control system 1510 to generate a composite view (e.g., from a perspective of a user that is wearing the NED device 1500) that includes both one or more computer-generated ("CG") images and a view of at least a portion of a real-world environment surrounding the NED device 1500. For example, the mirror control system 1510 may utilize various technologies such as, for example, augmented reality ("AR") technologies to generate composite views that include CG images superimposed over a real-world view. As such, the mirror control system 1510 may be configured to generate CG images via a display panel 1504.

In the illustrated example, the display panel 1504 includes separate right eye and left eye transparent display panels, labeled 1504R and 1504L, respectively. In some examples, the display panel 1504 may include a single transparent display panel that is viewable with both eyes and/or a single transparent display panel that is viewable by a single eye only.

It can be appreciated that the techniques described herein may be deployed within a single-eye NED device 1500 (e.g. GOOGLE GLASS) and/or a dual-eye NED device 1500 (e.g. MICROSOFT HOLOLENS). The NED device 1500 shown in FIG. 15 is an example device that is used to provide context and illustrate various features and aspects of the mirror control system 1510 disclosed herein. Other devices and systems may also use the mirror control system 1510 disclosed herein.

In some examples, the display panel 1504 may be a waveguide display that includes one or more diffractive optical elements ("DOEs") for in-coupling incident light into a waveguide, expanding the incident light in one or more directions for exit pupil expansion, and/or out-coupling the incident light out of the waveguide (e.g., toward a user's eye). In some examples, the NED device 1500 may further include an additional see-through optical component in the form of a transparent veil 1508 positioned between the real-world environment (which real-world environment makes up no part of the claimed invention) and the display panel 1504.

It can be appreciated that the transparent veil 1508 may be included in the NED device 1500 for purely aesthetic and/or protective purposes. The NED device 1500 may further include various other components, for example speakers, microphones, accelerometers, gyroscopes, magnetometers, temperature sensors, touch sensors, inertial measurement sensors, biometric sensors, other image sensors, energy-storage components (e.g. battery), a communication facility, a global positioning system ("GPS") receiver, etc.

In the illustrated example, a controller 1520 is operatively coupled to the mirror control system 1510. The controller 1520 includes one or more logic devices and one or more computer memory devices storing instructions executable by the logic device(s) to deploy aspects of the functionality described herein with relation to the mirror control system 1510. The controller 1520 and the mirror control system 1510 of the NED device 1500 are operatively connected, for example, via a bus 1530, which can include one or more of a system bus, a data bus, an address bus, a PCI bus, a Mini-PCI bus, and any variety of local, peripheral, and/or independent buses.

The controller 1520 can also include one or more processing units 1522. The processing unit(s) 1522, can represent, for example, a CPU-type processing unit, a GPU-type processing unit, a field-programmable gate array ("FPGA"), a digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

The controller 1520 can also include one or more computer-readable media 1524 storing an operating system 1526 and data such as, for example, image data that defines one or more CG images for presentation by the NED device 1500. The computer-readable media 1524 may further include an image-generation engine 1528 that generates output signals to control aspects of the operation of the mirror control system 1510 to present the CG images.

As used herein, computer-readable media, such as computer-readable media 1524, can store instructions executable by the processing units 1522. The computer-readable media 1524 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in the NED device 1500, while in some examples one or more of a CPU, GPU, and/or accelerator are external to the NED device 1500.

As used herein, the term computer-readable media can include computer storage media and/or communication media. Computer storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device in a non-transitory fashion.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 16:
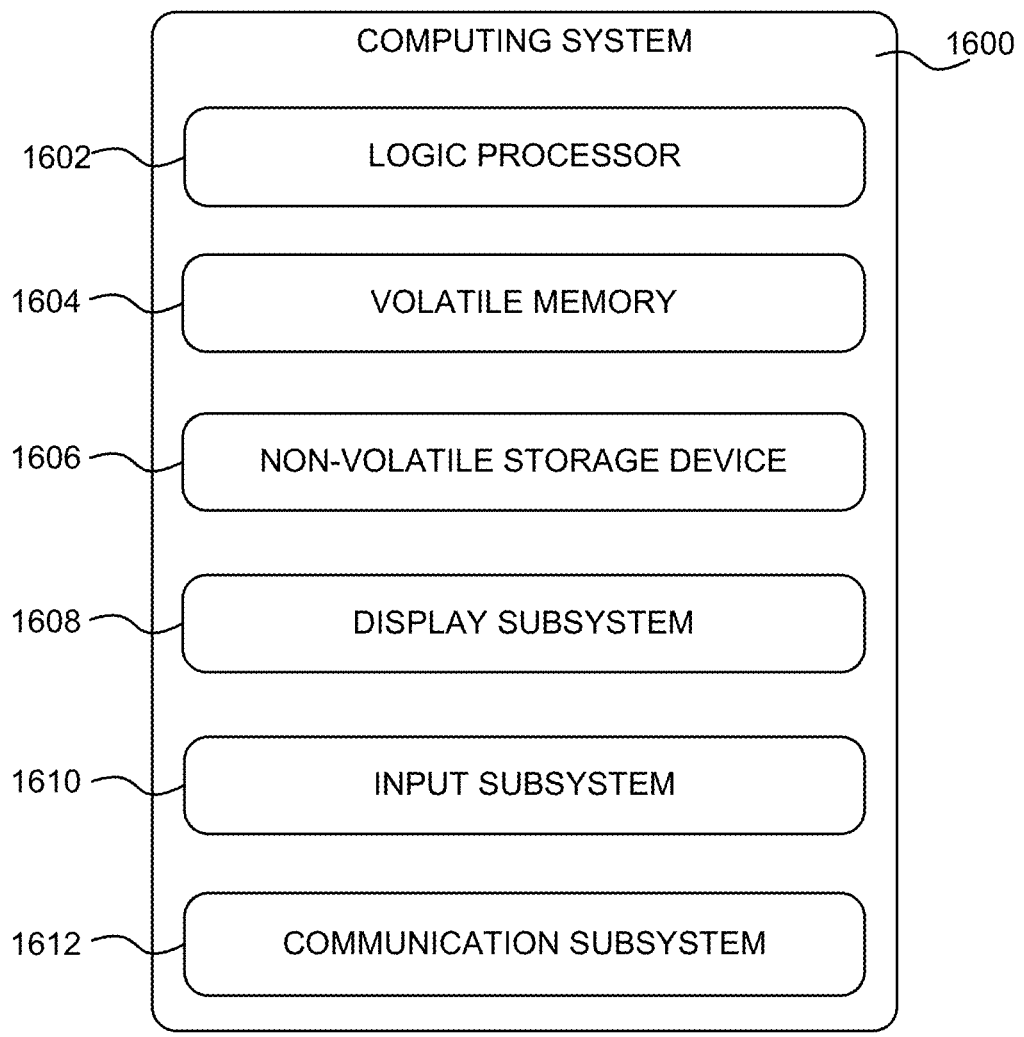
FIG. 16 shows an example computing environment in which the computer device may be enacted.

FIG. 16 shows an example computing environment in which aspects of the technologies disclosed herein can be implemented. In particular, FIG. 16 schematically shows a non-limiting embodiment of a computing system 1600 that can be used to implement the technologies disclosed herein. Computing system 1600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1600 includes a logic processor 1602 volatile memory 1604, and a non-volatile storage device 1606. Computing system 1600 may optionally include a display subsystem 1608, input subsystem 1610, communication subsystem 1612, and/or other components not shown in FIG. 16.

Logic processor 1602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1602 may include one or more physical processors (e.g., hardware) configured to execute software instructions. Additionally, or alternatively, the logic processor 1602 may include one or more hardware logic circuits or firmware devices configured to execute hardware-implemented logic or firmware instructions.

The logic processor 1602 may be single-core or multi-core, and the instructions executed thereon may be configured for sequential, parallel, and/or distributed processing. Individual components of the logic processor 1602 optionally may be distributed among two or more separate devices, which may be remotely located and/or configured for coordinated processing. Aspects of the operation of the logic processor 1602 may be virtualized and executed by remotely accessible, networked computing devices configured in a cloud-computing configuration. In such a case, these virtualized aspects are run on different physical logic processors of various different machines, it will be understood.

Non-volatile storage device 1606 includes one or more physical devices configured to hold instructions executable by the logic processors to implement aspects of the methods and processes described herein. When such methods and processes are implemented, the state of non-volatile storage device 1606 may be transformed—e.g., to hold different data.

Non-volatile storage device 1606 may include physical devices that are removable and/or built-in. Non-volatile storage device 1606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1606 may include nonvolatile, dynamic, static, read/write, read-only, sequential-access, location-addressable, file-addressable, and/or content-addressable devices. It will be appreciated that non-volatile storage device 1606 is configured to hold instructions even when power is cut to the non-volatile storage device 1606.

Volatile memory 1604 may include physical devices that include random access memory. Volatile memory 1604 is typically utilized by logic processor 1602 to temporarily store information during processing of software instructions. It will be appreciated that volatile memory 1604 typically does not continue to store instructions when power is removed from the volatile memory 1604. Aspects of logic processor 1602, volatile memory 1604, and non-volatile storage device 1606 may be integrated together into one or more hardware-logic components, such as within an ASIC, SOC, or FPGA.

The terms "module," "program," and "engine" may be used to describe an aspect of computing system 1600 typically implemented in software by a processor 1602 to perform a particular function using portions of volatile memory 1604, which function involves transformative processing that specially configures the processor 1602 to perform the function. Thus, a module, program, or engine may be instantiated via logic processor 1602 executing instructions held by non-volatile storage device 1606, using portions of volatile memory 1604.

It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1608 may be used to present a visual representation of data held by non-volatile storage device 1606. The visual representation may take the form of a graphical user interface ("GUI"). As the herein described methods and processes change the data held by the non-volatile storage device, and thus transform the state of the non-volatile storage device, the state of display subsystem 1608 may likewise be transformed to visually represent changes in the underlying data. Display subsystem 1608 may include one or more display devices utilizing virtually any type of technology, such as the LBS display devices disclosed herein. Such display devices may be combined with logic processor 1602, volatile memory 1604, and/or non-volatile storage device 1606 in a shared enclosure, or such display devices may be peripheral display devices.

When included, input subsystem 1610 may comprise or interface with one or more user-input devices such as a keyboard, mouse, touch screen, or game controller. In some embodiments, the input subsystem may comprise or interface with selected natural user input ("NUI") componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1612 may be configured to communicatively couple various computing devices described herein with each other, and with other devices. Communication subsystem 1612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The disclosure presented herein also encompasses the subject matter set forth in the following clauses:

Example Clause 1: display device to display an image in a display region, the display device comprising: a laser beam emitter (110) configured to emit a laser beam (112); a slow-scan mirror (220) that is responsive to a slow-scan drive signal (232) to direct the laser beam (112) onto the display region (140) and generate the display image (142), wherein the slow-scan mirror (220) generates a slow-scan feedback signal (233); a slow-scan driver (231) configured to generate the slow-scan drive signal (232) based on a signal waveform; and a slow-scan controller (210) configured to adjust the slow-scan drive signal (232) for the slow-scan mirror (220) with the slow-scan driver (231), wherein the slow-scan controller (210) comprises: an outer control loop with an open angle control (215) for the slow-scan mirror (220); and an inner control loop (230) with an adaptive waveform compensator (240) for the slow-scan mirror (220), wherein the outer control loop and the inner control loop are responsive to the slow-scan feedback signal (233), and wherein the adaptive waveform compensator (240) of the inner control loop (230) is configured to actively detect non-linearities in the slow-scan feedback signal (233) and dynamically adjust the signal waveform of the slow-scan drive signal (232) to compensate for the detected non-linearity.

Example Clause 2: The display device of clause 1, wherein the adaptive waveform compensator (240) is configured to evaluate VPZR measurements (710) to detect a non-linearity in the slow-scan feedback signal (233), calculate a non-linear compensation parameter (714) when the non-linearity is detected, and adjust the signal waveform of the slow-scan drive signal (716) with the calculated non-linear compensation parameter.

Example Clause 3: The display device of clause 1, wherein the adaptive waveform compensator (240) is configured to receive VPZR measurements (706) from the slow-scan feedback signal (233), calculate a display ramp from the received VPZR measurements (804), compute a difference between the calculated display ramp and the VPZR measurements to generate linearity deviation (LD) data (806), and compute one or more non-linearity error signals from the difference (808), wherein the waveform of the slow-scan drive signal (233) is dynamically adjusted responsive to the one or more non-linearity error signals.

Example Clause 4. The display device of clause 1, wherein the adaptive waveform compensator (240) is configured receive a frame of VPZR measurements from the slow-scan feedback signal (902), detect a maximum and minimum associated with the received frame of VPZR measurements (904), compute a display ramp as a linear fit of the received VPZR measurements between the detected maximum and minimum (906), compute a difference between the display ramp and the VPZR measurements to generate linearity deviation (LD) data (908), and compute one or more non-linearity error signals based on the LD data (808), wherein the signal waveform of the slow-scan drive signal (233) is dynamically adjusted responsive to the one or more non-linearity error signals.

Example Clause 5: The display device of clause 1, wherein the adaptive waveform compensator (240) is configured to the compute the one or more non-linearity error signals as a first non-linearity error signal from average LD data in a first region (910) of the display ramp and a second non-linearity error signal from average LD data in a second region (912) of the display ramp.

Example Clause 6: The display device of clause 5, wherein the adaptive waveform compensator (240) is configured to dynamically adjust the signal waveform of the slow-scan drive signal (233) in a first region of the signal waveform and a second region of the signal waveform responsive to the associated first and second non-linearity error signals, respectively.

Example Clause 7: The display device of clause 4, wherein the adaptive waveform compensator (240) is further configured to adjust one or more non-linearity compensation parameters responsive to the one or more non-linearity error signals (1004), and adjust the signal waveform of the slow-scan drive signal (233) to pre-distort in one or more regions of the signal waveform based on the one or more non-linearity compensation parameters (1008).

Example Clause 8: The display device of clause 4, wherein the adaptive waveform compensator (240) is further configured to adjust one or more non-linearity compensation parameters responsive to a first of the one or more non-linearity error signals with a first PID controller (520, 1104), adjust one or more non-linearity compensation parameters responsive to a second of the one or more non-linearity error signals with a second PID controller (530, 1108) and adjust the signal waveform of the slow-scan drive signal (233) to pre-distort in one or more regions of the signal waveform based on the one or more non-linearity compensation parameters (1112).

Example Clause 9: The display device of clause 1, wherein the adaptive waveform compensator (240) comprises: a non-linearity detector (320) configured to detect one or more non-linearities of slow-scan mirror (220) from the slow-scan feedback signal (233) and generate one or more non-linearity error signals; and an active compensator (310) configured to receive the one or more non-linearity error signals and actively adjust the signal waveform of the slow-scan drive signal (232) in one or more regions of the signal waveform based on the detected one or more non-linearities of the slow-scan feedback signal (233).

Example Clause 10: The display device of clause 9, wherein the non-linearity detector (320) is configured to detect one or more non-linearities of the slow-scan mirror (220) from an analog value associated with the slow-scan feedback signal (233).

Example Clause 11: The display device of clause 9, wherein the non-linearity detector (320) is configured to detect one or more non-linearities of the slow-scan mirror (220) from a digital value associated with the slow-scan feedback signal (233).

Example Clause 12: The display device of clause 9, wherein the non-linearity detector (320) comprises: a buffer (410) configured to receive the slow-scan feedback signal (233) and provide a buffered signal; and a linearity error calculator (420) configured to receive the buffered signal and provide one or more linearity error signals responsive to the buffered signal, wherein the one or more linearity error signals indicate a non-linearity error associated with the slow-scan feedback signal (233) in one or more regions corresponding to the signal waveform.

Example Clause 13: The display device of clause 12, wherein the buffer (410) is configured to capture sampled data points associated with the slow-scan mirror (330) from the slow-scan feedback signal, wherein the sampled data points corresponds to at least one frame of VPZR measurements from the slow-scan mirror (330) that corresponds to a ramp signal.

Example Clause 14: The display of clause 12, wherein linearity error calculator (420) is configured to evaluate sampled data points associated with the slow-scan mirror (330), identify a best linear fit ramp signal for the sampled data points between a maximum value and minimum value of the sampled data points, and compare each of the sampled data points to the best linear fit ramp signal to compute a linearity deviation for each sampled data point, and generate the one or more non-linearity error signals based on the computed linearity deviation for each sampled data point.

Example Clause 15: The display device of clause 14, wherein the linearity error calculator (420) is further configured to compare the computed linearity deviation to a predefined range and also configured to assert one or more of the non-linearity error signals when the computed linearity deviation is outside of the predefined range.

Example Clause 16: The display device of clause 14, wherein the linearity error calculator (420) configured such that one or more non-linearity error signals are asserted when the linearity deviation is in a range with a magnitude of about one pixel, about two pixels, about three pixels, or about four pixels.

Example Clause 17: The display device of clause 9, wherein the active compensator (310) comprises: one or more PID controllers (520, 530) configured responsive to the one or more slope error signals to generate one or more corresponding control signals; and a non-linear compensator (510) configured to receive the one or more control signals from the one or more PID controllers (520, 530) and actively adjust a characteristic the signal waveform in a region of the slow-scan drive signal (232) to compensate for detected non-linearities in the slow-scan mirror (220) associated with the region.

Example Clause 18: The display device of clause 9, wherein the active compensator (310) comprises: a first PID controller (520, 1104) configured to adjust a first non-linearity compensation parameters responsive to a first of the one or more non-linearity error signals; a second PID controller (530, 1108) configured to adjust a second non-linearity compensation parameters responsive to a second of the one or more non-linearity error signals; and a non-linear compensator configured to adjust the signal waveform of the slow-scan drive signal (233) to pre-distort based on one or more of the first and second non-linearity compensation parameters (1112), wherein the first and second non-linearity compensation parameters are each associated with a respective region of the signal waveform.

Example Clause 19: The display device of clause 1, wherein the inner control loop is configured to compensate for non-linearities that are actively detected in the slow-scan feedback signal based on one or more of manufacturing variations, material degradation that occurs in normal use, or an environmental property associated with the slow-scan mirror, wherein the environmental property comprises at least one of a temperature, humidity, or a vibration level.

Example Clause 20: The display device of clause 14, wherein the inner control loop is configured to limit the adjustment of the signal waveform to a maximum value.

Example Clause 21: The display device of clause 1, wherein the adaptive waveform compensator (240) comprises: a buffer (410) configured to receive and buffer VPZR measurements from the slow-scan feedback signal (233); a linearity error calculator (420) configured to receive the buffered VPZR measurements from the buffer and compute a display ramp from the VPZR measurements, compute a first non-linearity error signal from average LD data in a first region (910) of the display ramp, compute a second non-linearity error signal from average LD data in a second region (912) of the display ramp; an ALPHA PID controller (520) configured to generate a first control signal responsive to the first non-linearity error signal; a BETA PID controller (530) configured to generate a second control signal responsive to the second non-linearity error signal; and a non-linear compensator that is configured to receive the first and second control signals and actively adjust a characteristic of the signal waveform of the slow-scan drive signal (232) to pre-distort the signal waveform in at least first and second regions to compensate for detected non-linearities in the slow-scan feedback signal (233) based on computed display ramp.

Example Clause 21: A system to display an image in a display region, the system comprising: a laser beam emitter (110) configured to emit a laser beam (112); a slow-scan mirror (220) that is responsive to a slow-scan drive signal (232) to direct the laser beam (112) onto the display region (140) and generate the display image (142), wherein the slow-scan mirror (220) generates a slow-scan feedback signal (233) that indicates a VPZR measurement associated with the slow-scan mirror (220); a slow-scan driver (231) configured to generate the slow-scan drive signal (232) based on a signal waveform; and a slow-scan controller (210) configured to adjust the slow-scan drive signal (232) for the slow-scan mirror (220) with the slow-scan driver (231), wherein the slow-scan controller (210) comprises: an outer control loop with an open angle control (215) for the slow-scan mirror (220); and an inner control loop (230) with an adaptive waveform compensator (240) for the slow-scan mirror (220), wherein the outer control loop and the inner control loop are responsive to the slow-scan feedback signal (233), and wherein the adaptive waveform compensator (240) of the inner control loop (230) includes: a linearity detector that captures VPZR measurements from the slow-scan feedback signal (233), analyzes the VPZR measurements to determine a linearity deviation associated with the VPZR measurements compared to a ramp signal derived from the VPZR measurements, and identify one more linearity errors associated with the slow-scan feedback signal (233) in one or more regions corresponding to the signal waveform; and an active compensator (310) configured to actively adjust the signal waveform of the slow-scan drive signal (232) in one or more regions of the signal waveform identified one or more linearity errors of the slow-scan feedback signal (233).

Example Clause 22: A system to display an image in a display region, the system comprising: a laser beam emitter (110) configured to emit a laser beam (112); a slow-scan mirror (220) that is responsive to a slow-scan drive signal (232) to direct the laser beam (112) onto the display region (140) and generate the display image (142), wherein the slow-scan mirror (220) generates a slow-scan feedback signal (233) that indicates VPZR measurements associated with the slow-scan mirror (220); a slow-scan driver (231) configured to generate the slow-scan drive signal (232) based on a signal waveform; and a slow-scan controller (210) configured to adjust the slow-scan drive signal (232) for the slow-scan mirror (220) with the slow-scan driver (231), wherein the slow-scan controller (210) comprises: an outer control loop with an open angle control (215) for the slow-scan mirror (220); and an inner control loop (230) with an adaptive waveform compensator (240) for the slow-scan mirror (220), wherein the outer control loop and the inner control loop are responsive to the slow-scan feedback signal (233), and wherein the adaptive waveform compensator (240) of the inner control loop (230) includes: a buffer (410) configured to receive and buffer the VPZR measurements from the slow-scan feedback signal (233); a linearity error calculator (420) configured to receive the buffered VPZR measurements from the buffer, compute a display ramp from the buffered VPZR measurements, detect linearity deviation (LD) in one or more regions of the display ramp, and generate one or more a non-linearity error signals based on the detected LD in the one or more regions of the display ramp; one or more PID controllers (520, 530), each configured to generate a control signal responsive to a corresponding one of the non-linearity error signals; a non-linear compensator (510) that is configured to receive each control signal from the one or more PID controllers (520, 530) and actively adjust a characteristic of the signal waveform of the slow-scan drive signal (232) to pre-distort the signal waveform to compensate for detected non-linearities in the waveform of the slow-scan feedback signal (233) based on the one or more regions of the display ramp with detected linearity deviation.

Example Clause 23: A method to display an image in a display region of a display device, the method comprising: generating (702), with a slow-scan controller (210), a signal waveform for a slow-scan drive signal (232) that drives a slow-scan mirror (220); directing (704), with the slow-scan mirror (220), a laser beam onto the display region of the display device to display the image, wherein a beam deflection angle of the laser beam is responsive to the slow-scan drive signal (232); generating (706), with the slow-scan mirror (220), a slow-scan feedback signal (233) that includes VPZR measurements associated with the slow-scan mirror (220); receiving (708), with the slow-scan controller (210), the slow-scan feedback signal (234) with VPZR measurements from the slow-scan mirror (220); evaluating (710), with the slow-scan controller (210), the VPZR measurements to identify a non-linearity characteristic of the slow-scan feedback signal (233); calculating (714), with the slow-scan controller (210), one or more compensation parameters associated with the signal waveform based on the VPZR measurements when the non-linearity characteristic of the slow-scan feedback signal (233) is identified (712); and adjusting (716), with the slow-scan controller (210), the signal waveform of the slow-scan drive signal (232) such that the slow-scan drive signal (232) is pre-distorted to compensate for the identified non-linearity characteristic of the slow-scan feedback signal (233) based on the one or more compensation parameters.

Example Clause 24: The method of clause 23, wherein evaluating (710) the VPZR measurements with the slow-scan controller (210) comprises: calculating (804) a display ramp with the VPZR measurements from the slow-scan feedback signal (233); computing (806) a linearity deviation (806) between the calculated display ramp and the VPZR measurements to generate LD data; and computing (808) one or more non-linearity error signals from the LD data.

Example Clause 25: The method of clause 23, wherein receiving (708) the VPZR measurements comprises receiving (902) a frame of VPZR measurements with a buffer, wherein the VPZR measurements correspond to digital data that is captured by the buffer for the frame of the display.

Example Clause 26: The method of clause 25, wherein evaluating (710) the VPZR measurements with the slow-scan controller (210) comprises: detecting (904) a maximum value and a minimum value associated with the frame of VPZR measurements; computing (906) a display ramp with a linear fit of the VPZR measurements between the maximum value and the minimum value; computing (908) a difference between the display ramp and the VPZR measurements to generate linearity deviation (LD) data; and computing (910, 912) one or more non-linearity error signals from the average LD data in one or more regions of the display ramp, wherein each of the one or more regions corresponds to a non-linearity characteristic of the slow-scan feedback signal (233).

Example Clause 27: The method of clause 26, wherein calculating (714) one or more compensation parameters comprises adjusting (1004) one or more non-linearity compensation parameters responsive to a corresponding one of the one or more non-linearity error signals.

Example Clause 28: The method of clause 27, wherein adjusting (716) the signal waveform of the slow-scan drive signal (232) comprises adjusting (1008) the drive signal waveform with the one or more non-linearity compensation parameters, wherein each of the one or more non-linearity compensation parameters corresponds to a different region of the drive signal waveform that is associated with the corresponding non-linearity characteristic of the slow-scan feedback signal (233).

Example Clause 29: A method for a display device to display an image in a display region, the method comprising: generating (702), with a slow-scan controller (210), a signal waveform for a slow-scan drive signal (232) that drives a slow-scan mirror (220); directing (704), with the slow-scan mirror (220), a laser beam onto the display region of the display device to display the image, wherein a beam deflection angle of the laser beam is responsive to the slow-scan drive signal (232); generating (706), with the slow-scan mirror (220), a slow-scan feedback signal (233) that includes VPZR measurements associated with the slow-scan mirror (220); receiving (708), with a buffer (410) in the slow-scan controller (210), the slow-scan feedback signal (234) with a frame of VPZR measurements from the slow-scan mirror (220); evaluating (710), with a linearity error calculator (420) of the slow-scan controller (210), the frame of VPZR measurements to identify a non-linearity characteristic of the slow-scan feedback signal (233) by: calculating (804) a display ramp with the frame of VPZR measurements; computing (806) a linearity deviation (806) between the calculated display ramp and the VPZR measurements to generate LD data; and computing (808) at least a first and a second non-linearity error signal from the LD data; adjusting (1104), with a first PID controller (520) of the slow-scan controller (210), a first compensation parameters associated with the signal waveform based on the first non-linearity error signal, wherein the first compensation parameter is associated with a first non-linearity characteristic of the slow-scan feedback signal (233) in a first region of the frame of VPZR measurements; adjusting (1108), with a second PID controller (520) of the slow-scan controller (210), a second compensation parameters associated with the signal waveform based on the second non-linearity error signal, wherein the second compensation parameter is associated with a second non-linearity characteristic of the slow-scan feedback signal (233) in a second region of the frame of VPZR measurements; and adjusting (1112), with a non-linear compensator (510) of the slow-scan controller (210), the signal waveform for a slow-scan drive signal (232) to predistort based on the first and second compensation parameters such that the drive signal waveform is compensated for the detected non-linearity characteristics of the slow-scan feedback signal (233).

The subject matter of the present disclosure includes all novel and non-obvious combinations and sub-combinations of the various processes, systems and configurations, and other features, functions, acts, and/or properties disclosed herein, as well as any and all equivalents thereof.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. It is also understood that a "loop" or a "control loop" refers to any process, module, chipset, or any hardware or software component performing a set of operations that execute periodically. The period in which the set of operations repeat is based on a physical clock speed and/or any mechanism that controls a delay between each execution.

The subject matter of the present disclosure includes all novel and non-obvious combinations and sub-combinations of the various processes, systems and configurations, and other features, functions, acts, and/or properties disclosed herein, as well as any and all equivalents thereof.

We claim:

1. A display device to display an image in a display region, the display device comprising:
    a laser beam emitter configured to emit a laser beam;
    a slow-scan mirror that is responsive to a slow-scan drive signal to direct the laser beam onto the display region and generate the display image, wherein the slow-scan mirror generates a slow-scan feedback signal;
    a slow-scan driver configured to generate the slow-scan drive signal based on a signal waveform; and
    a slow-scan controller configured to adjust the slow-scan drive signal for the slow-scan mirror with the slow-scan driver, wherein the slow-scan controller comprises:
        an outer control loop with an open angle control for the slow-scan mirror; and
        an inner control loop with an adaptive waveform compensator for the slow-scan drive signal, wherein the outer control loop and the inner control loop are responsive to the slow-scan feedback signal, and wherein the adaptive waveform compensator of the inner control loop is configured to actively detect one or more non-linearities in the slow-scan feedback signal and dynamically adjust the signal waveform of the slow-scan drive signal to compensate for the one or more detected non-linearities.

2. The display device of claim 1, wherein the adaptive waveform compensator is configured to evaluate VPZR measurements to detect a non-linearity in the slow-scan feedback signal, calculate a non-linear compensation parameter when the non-linearity is detected, and adjust the signal waveform of the slow-scan drive signal with the calculated non-linear compensation parameter.

3. The display device of claim 1, wherein the adaptive waveform compensator is configured to receive VPZR measurements from the slow-scan feedback signal, calculate a display ramp from the received VPZR measurements, compute a difference between the calculated display ramp and the VPZR measurements to generate linearity deviation (LD) data, and compute one or more non-linearity error signals from the difference, wherein the waveform of the slow-scan drive signal is dynamically adjusted responsive to the one or more non-linearity error signals.

4. The display device of claim 1, wherein the adaptive waveform compensator is configured receive a frame of VPZR measurements from the slow-scan feedback signal, detect a maximum and minimum associated with the received frame of VPZR measurements, compute a display ramp as a linear fit to at least a portion of the received VPZR measurements between the detected maximum and minimum, compute a difference between the display ramp and the VPZR measurements to generate linearity deviation (LD) data, and compute one or more non-linearity error signals based on the LD data, wherein the signal waveform of the slow-scan drive signal is dynamically adjusted responsive to the one or more non-linearity error signals.

5. The display device of claim 4, wherein the adaptive waveform compensator is further configured to adjust one or more non-linearity compensation parameters responsive to the one or more non-linearity error signals, and adjust the signal waveform of the slow-scan drive signal to pre-distort in one or more regions of the signal waveform based on the one or more non-linearity compensation parameters.

6. The display device of claim 4, wherein the adaptive waveform compensator is further configured to adjust one or more non-linearity compensation parameters responsive to a first of the one or more non-linearity error signals with a first PID controller, adjust one or more non-linearity compensation parameters responsive to a second of the one or more non-linearity error signals with a second PID controller and adjust the signal waveform of the slow-scan drive signal to pre-distort in one or more regions of the signal waveform based on the one or more non-linearity compensation parameters.

7. The display device of claim 1, wherein the adaptive waveform compensator is configured to the compute the one or more non-linearity error signals as a first non-linearity error signal from average LD data in a first region of the display ramp and a second non-linearity error signal from average LD data in a second region of the display ramp.

8. The display device of claim 7, wherein the adaptive waveform compensator is configured to dynamically adjust the signal waveform of the slow-scan drive signal in a first region of the signal waveform and a second region of the signal waveform responsive to the associated first and second non-linearity error signals, respectively.

9. The display device of claim 1, wherein the adaptive waveform compensator comprises:
a non-linearity detector configured to detect one or more non-linearities of the slow-scan feedback signal and generate one or more non-linearity error signals; and
an active compensator configured to receive the one or more non-linearity error signals and actively adjust the signal waveform of the slow-scan drive signal in one or more regions of the signal waveform based on the detected one or more non-linearities of the slow-scan feedback signal.

10. The display device of claim 9, wherein the non-linearity detector is configured to detect one or more non-linearities of the slow-scan mirror from either an analog value or a digital value associated with the slow-scan feedback signal.

11. The display device of claim 9, wherein the non-linearity detector comprises:
a buffer configured to receive the slow-scan feedback signal and provide a buffered signal; and
a linearity error calculator configured to receive the buffered signal and provide one or more non-linearity error signals responsive to the buffered signal, wherein the one or more non-linearity error signals indicate a non-linearity error associated with the slow-scan feedback signal in one or more regions corresponding to the signal waveform.

12. The display device of claim 9, wherein the active compensator comprises:
one or more PID controllers configured responsive to the one or more non-linearity error signals to generate one or more corresponding control signals; and
a non-linear compensator configured to receive the one or more control signals from the one or more PID controllers and actively adjust a characteristic the signal waveform in a region of the slow-scan drive signal to compensate for detected non-linearities in the waveform of the slow-scan feedback signal associated with the region.

13. The display device of claim 9, wherein the active compensator comprises:
a first PID controller configured to adjust a first non-linearity compensation parameters responsive to a first of the one or more non-linearity error signals;
a second PID controller configured to adjust a second non-linearity compensation parameters responsive to a second of the one or more non-linearity error signals; and
a non-linear compensator configured to adjust the signal waveform of the slow-scan drive signal to pre-distort based on one or more of the first and second non-linearity compensation parameters, wherein the first and second non-linearity compensation parameters are each associated with a respective region of the signal waveform.

14. The display device of claim 1, wherein the inner control loop is configured to compensate for non-linearities that are actively detected in the slow-scan mirror based on one or more of manufacturing variations, material degradation that occurs in normal use, or an environmental property associated with the slow-scan mirror, wherein the environmental property comprises at least one of a temperature, humidity, or a vibration level.

15. The display device of claim 1, wherein the adaptive waveform compensator comprises:
a buffer configured to receive and buffer VPZR measurements from the slow-scan feedback signal;
a linearity error calculator configured to receive the buffered VPZR measurements from the buffer and compute a display ramp from the VPZR measurements, compute a first non-linearity error signal from average LD data in a first region of the display ramp, compute a second non-linearity error signal from average LD data in a second region of the display ramp;
an ALPHA PID controller configured to generate a first control signal responsive to the first non-linearity error signal;
a BETA PID controller configured to generate a second control signal responsive to the second non-linearity error signal; and
a waveform compensator that is configured to receive the first and second control signals and actively adjust a characteristic of the signal waveform of the slow-scan drive signal to pre-distort the signal waveform in at least first and second regions to compensate for detected non-linearities in the waveform of the slow-scan feedback signal based on computed display ramp.

16. A method to display an image in a display region of a display device, the method comprising:

generating, with a slow-scan controller, a signal waveform for a slow-scan drive signal that drives a slow-scan mirror;

directing, with the slow-scan mirror, a laser beam onto the display region of the display device to display the image, wherein a beam deflection angle of the laser beam is responsive to the slow-scan drive signal;

generating, with the slow-scan mirror, a slow-scan feedback signal that includes VPZR measurements associated with the slow-scan mirror;

receiving, with the slow-scan controller, the slow-scan feedback signal with VPZR measurements from the slow-scan mirror;

evaluating, with the slow-scan controller, the VPZR measurements to identify a non-linearity characteristic of the slow-scan feedback signal;

calculating, with the slow-scan controller, one or more compensation parameters associated with the signal waveform based on the VPZR measurements when the non-linearity characteristic of the slow-scan feedback signal is identified; and adjusting, with the slow-scan controller, the signal waveform of the slow-scan drive signal such that the slow-scan drive signal is pre-distorted to compensate for the identified non-linearity characteristic of waveform of the slow-scan feedback signal based on the one or more compensation parameters.

17. The method of claim 16, wherein evaluating the VPZR measurements with the slow-scan controller comprises:

calculating a display ramp with the VPZR measurements from the slow-scan mirror;

computing a linearity deviation between the calculated display ramp and the VPZR measurements to generate linearity deviation (LD) data; and computing one or more non-linearity error signals from the LD data.

18. The method of claim 17, wherein receiving the VPZR measurements comprises:
receiving a frame of VPZR measurements with a buffer, wherein the VPZR measurements correspond to digital data that is captured by the buffer for the frame of the display; and wherein evaluating the VPZR measurements with the slow-scan controller comprises:
detecting a maximum value and a minimum value associated with the frame of VPZR measurements;
computing a display ramp with a linear fit to at least a portion of the VPZR measurements between the maximum value and the minimum value;
computing a difference between the display ramp and the VPZR measurements to generate linearity deviation (LD) data; and
computing one or more non-linearity error signals from the LD data in one or more regions of the display ramp, wherein each of the one or more regions corresponds to a non-linearity characteristic of the waveform of the slow-scan feedback signal.

19. The method of claim 18, wherein calculating one or more compensation parameters comprises
adjusting one or more non-linearity compensation parameters responsive to a corresponding one of the one or more non-linearity error signals; and wherein adjusting the signal waveform of the slow-scan drive signal comprises:
adjusting the drive signal waveform with the one or more non-linearity compensation parameters, wherein each of the one or more non-linearity compensation parameters corresponds to a different region of the drive signal waveform that is associated with the corresponding non-linearity characteristic of the waveform of the slow-scan feedback signal.

20. The method of claim 19, wherein adjusting the drive signal waveform comprises:

adjusting, with a first PID controller of the slow-scan controller, a first compensation parameters associated with the signal waveform based on the first non-linearity error signal, wherein the first compensation parameter is associated with a first non-linearity characteristic of the slow-scan feedback signal in a first region of the frame of VPZR measurements;

adjusting, with a second PID controller of the slow-scan controller, a second compensation parameters associated with the signal waveform based on the second non-linearity error signal, wherein the second compensation parameter is associated with a second non-linearity characteristic of the slow-scan feedback signal in a second region of the frame of VPZR measurements; and adjusting, with a waveform compensator of the slow-scan controller, the signal waveform for a slow-scan drive signal to pre-distort based on the first and second compensation parameters such that the drive signal waveform is compensated for the detected non-linearity characteristics of waveform of the slow-scan feedback signal.

* * * * *